(12) United States Patent
Doi et al.

(10) Patent No.: US 7,340,114 B2
(45) Date of Patent: Mar. 4, 2008

(54) OPTICAL WAVEGUIDE DEVICE AND OPTICAL MODULATOR

(75) Inventors: Masaharu Doi, Kawasaki (JP); Masaki Sugiyama, Kawasaki (JP); Tadao Nakazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 113 days.

(21) Appl. No.: 10/345,938

(22) Filed: Jan. 17, 2003

(65) Prior Publication Data

US 2003/0147591 A1 Aug. 7, 2003

(30) Foreign Application Priority Data

Feb. 7, 2002 (JP) ............... 2002-031304

(51) Int. Cl.
*G02F 1/035* (2006.01)

(52) U.S. Cl. ................. 385/2; 385/3; 385/39

(58) Field of Classification Search ............... 385/1–3, 385/39–42
See application file for complete search history.

(56) References Cited

U.S. PATENT DOCUMENTS

| | | | | |
|---|---|---|---|---|
| 4,223,977 A | * | 9/1980 | Papuchon et al. ............ 385/14 |
| 4,288,785 A | * | 9/1981 | Papuchon et al. ........... 341/111 |
| 4,618,210 A | * | 10/1986 | Kondo ......................... 385/17 |
| 4,665,363 A | * | 5/1987 | Extance et al. .......... 324/244.1 |
| 4,763,973 A | * | 8/1988 | Inoue et al. ................... 385/12 |
| 4,904,940 A | * | 2/1990 | Rampt ..................... 324/244.1 |
| 4,989,979 A | * | 2/1991 | Buckman ..................... 356/477 |
| 5,031,235 A | * | 7/1991 | Raskin et al. .................. 398/66 |
| 5,040,865 A | * | 8/1991 | Chen et al. .................... 385/2 |
| 5,051,578 A | * | 9/1991 | Slemon et al. .......... 250/227.23 |
| 5,111,517 A | * | 5/1992 | Riviere ........................ 385/11 |
| 5,117,471 A | * | 5/1992 | Furstenau .................... 385/16 |
| 5,148,503 A | * | 9/1992 | Skeie ............................. 385/3 |
| 5,168,534 A | * | 12/1992 | McBrien et al. ................ 385/3 |
| 5,259,044 A | * | 11/1993 | Isono et al. .................... 385/2 |
| 5,278,923 A | * | 1/1994 | Nazarathy et al. ............. 385/3 |
| 5,323,406 A | * | 6/1994 | Yee et al. ..................... 372/26 |
| 5,429,243 A | * | 7/1995 | Woelk et al. ................ 206/538 |
| 5,611,005 A | * | 3/1997 | Heismann et al. ............ 385/11 |

(Continued)

FOREIGN PATENT DOCUMENTS

| | | |
|---|---|---|
| EP | 1 326 131 A1 | 1/2002 |
| JP | 61-80109 | 4/1986 |
| JP | 3-145623 | 6/1991 |
| JP | 5-53086 | 3/1993 |
| JP | 8-146366 | 6/1996 |
| JP | 10-123471 | 5/1998 |
| JP | 11-133364 | 5/1999 |
| JP | 2001-215455 | 8/2001 |
| JP | 2001-296506 | 10/2001 |
| JP | 2002-23123 | 1/2002 |

OTHER PUBLICATIONS

Japanese Patent Office Notice of Reasons for Rejection mailed Jul. 4, 2006 for corresponding Japanese Patent Application No. 2002-031304.

(Continued)

*Primary Examiner*—Ellen E. Kim
(74) *Attorney, Agent, or Firm*—Staas & Halsey LLP

(57) ABSTRACT

An optical waveguide device includes a substrate having an electro-optical effect, an optical waveguide formed on the substrate, an electrode provided for the optical waveguide, a monitoring optical waveguide for guiding part of light outputted from the optical waveguide as monitor light, an attenuation section provided for the monitoring optical waveguide for attenuating the monitor light, and a light detection section for detecting the intensity of the monitor light guided by the monitoring optical waveguide and attenuated by the attenuation section.

28 Claims, 15 Drawing Sheets

U.S. PATENT DOCUMENTS

| | | | |
|---|---|---|---|
| 5,617,500 A * | 4/1997 | Shionoya et al. | 385/132 |
| 5,644,664 A * | 7/1997 | Burns et al. | 385/2 |
| 5,680,497 A * | 10/1997 | Seino et al. | 385/129 |
| 5,723,856 A * | 3/1998 | Yao et al. | 250/227.11 |
| 5,764,400 A * | 6/1998 | Itou et al. | 359/245 |
| 5,802,222 A * | 9/1998 | Rasch et al. | 385/1 |
| 5,854,862 A * | 12/1998 | Skeie | 385/2 |
| 5,900,621 A | 5/1999 | Nagakubo et al. | 250/205 |
| 5,923,795 A * | 7/1999 | Toyohara | 385/11 |
| 5,933,001 A * | 8/1999 | Hubbell | 324/96 |
| 5,995,685 A * | 11/1999 | Seino | 385/3 |
| 6,016,371 A * | 1/2000 | Wickham et al. | 385/10 |
| 6,166,756 A * | 12/2000 | White et al. | 347/239 |
| 6,201,237 B1 * | 3/2001 | Berkey et al. | 250/227.14 |
| 6,332,055 B1 * | 12/2001 | Hatayama et al. | 385/140 |
| 6,335,524 B1 * | 1/2002 | Udd et al. | 250/227.18 |
| 6,445,477 B1 * | 9/2002 | Madsen et al. | 398/192 |
| 6,522,797 B1 * | 2/2003 | Siems et al. | 385/12 |
| 6,529,647 B2 * | 3/2003 | Tabuchi | 385/3 |
| 6,775,426 B2 * | 8/2004 | Ito et al. | 385/11 |
| 6,795,596 B2 | 9/2004 | Bülow | |
| 2001/0009594 A1 * | 7/2001 | Hosoi | 385/2 |
| 2001/0024537 A1 * | 9/2001 | Tabuchi | 385/3 |
| 2001/0030791 A1 | 10/2001 | Taneda | 359/181 |
| 2002/0006245 A1 | 1/2002 | Kubota et al. | 385/14 |
| 2002/0149780 A1 * | 10/2002 | Trinh | 356/477 |
| 2002/0191190 A1 * | 12/2002 | Cierullies et al. | 356/477 |
| 2003/0016937 A1 * | 1/2003 | Caracci et al. | 385/140 |
| 2003/0219188 A1 * | 11/2003 | Doi et al. | 385/3 |

OTHER PUBLICATIONS

Reference AH (Japanese Patent Laid-Open No. 2001-296506) corresponds to Reference AA (U.S. Patent Publication No. 2001/0030791).

Reference AI (Japanese Patent Laid-Open No. 2002-23123) corresponds to Reference AB (U.S. Patent Publication No. 2002/0006245).

Reference AJ (Japanese Patent Laid-Open No. 10-123471) corresponds to Reference AC (U.S. Patent No. 5,900,621).

Japanese Office Action, dated Oct. 3, 2006, and issued in priority Japanese Application No. 2002-031304.

European Office Action dated Nov. 6, 2006 issued in corresponding European patent application No. 03001352.8-2205.

* cited by examiner

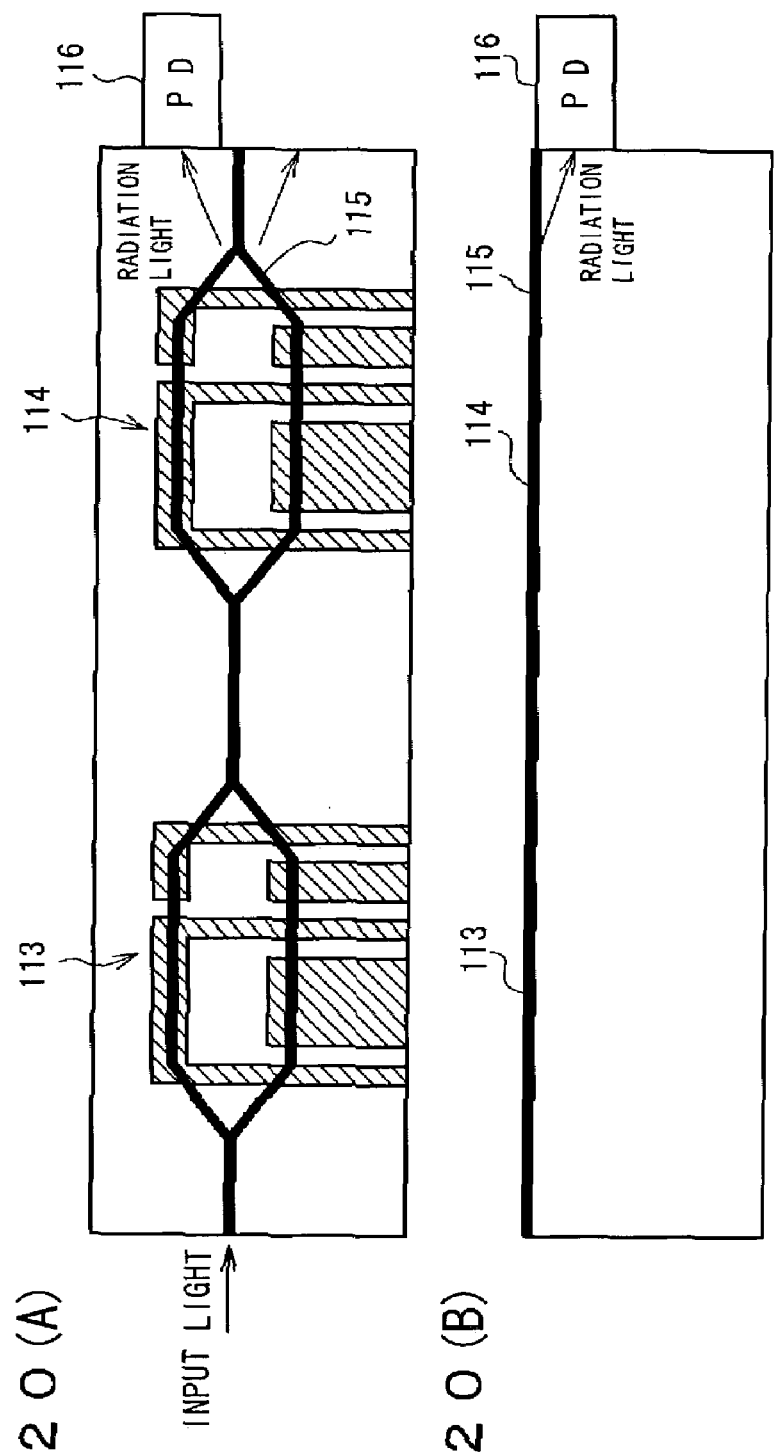

OPTICAL WAVEGUIDE DEVICE AND OPTICAL MODULATOR

BACKGROUND OF THE INVENTION

1) Field of the Invention

This invention relates to an optical waveguide device and an optical modulator for use with optical communication.

2) Description of the Related Art

In recent years, expectations on an optical modulator of the external modulation type (external modulator) have been and are increasing in order to realize a very high-speed and broadband optical communication network system.

Particularly, in order to realize long haul transmission of a light signal, a Mach-Zehnder type (MZ) optical modulator (MZ type LN optical modulator) for which $LiNbO_3$ (lithium niobate; LN) is used and which is excellent in a high-speed modulation characteristic and a dispersion resistance characteristic in a broadband has been and is being developed.

In the MZ type LN optical modulator, an operating point is fluctuated by a temperature drift, a DC drift or the like, and therefore, a bias voltage is applied in order to compensate for the fluctuation of the operating point. Generally, a monitoring PD (photo-detector, light detection section) is provided on the output side of an optical modulator to detect radiation mode light radiated from a branching portion of a Y-branch optical waveguide on the output side of the MZ type optical waveguide as monitor light, and feedback control for controlling the bias voltage based on the detected monitor light is performed.

However, where the radiation mode light is used as the monitor light as described above, since the intensity of the radiation mode light is low, it is necessary to use a high-sensitivity PD as the monitoring PD for use for detection of the light intensity. Therefore, the degree of freedom in selection of a monitoring PD is low. Also a process of a signal detected by the monitoring PD is limited.

It is a possible idea to provide, for example, as shown in FIG. 18, a 3 dB directional coupler 111 on the output side of an MZ type optical waveguide 110, connect a monitoring optical waveguide 112 to one of ports on the output side of the 3 dB directional coupler 111 to detect the intensity of the monitor light guided through the monitoring optical waveguide 112 and use the detected intensity for the feed back control of the bias voltage.

However, if the monitor light is extracted by such a method as described above, then the intensity of the monitor light is equal to the intensity of output light (signal light) as seen in FIG. 19. Consequently, there is the possibility that, if the intensity of the input light is high, then the intensity of the input light may be so high as the intensity of monitor light that the monitoring PD may be broken.

Incidentally, an RZ (Return to Zero) optical modulator which performs modulation with a clock signal and modulation with a data signal using two stages of Mach-Zehnder type optical modulators coupled in series to produce an RZ signal has been proposed recently.

In such an RZ optical modulator as described above, it is a possible idea to detect, for example, as shown in FIGS. 20(A) and 20(B), only radiation mode light radiated from a branching portion of a Y-branch optical waveguide 115 on the output side of an Mach-Zehnder type optical modulator 114 provided on the latter stage from within two stages of Mach-Zehnder type optical modulators 113 and 114 as monitor light by means of a monitor PD 116 and then perform bias control of both of the two-stages of the Mach-Zehnder type optical modulator 113 and 114 based on the detected light.

However, in such a method as described above, it is difficult to perform accurate bias control, and further, the control is complicated.

SUMMARY OF THE INVENTION

It is an object of the present invention to provide an optical waveguide device and an optical modulator by which the degree of freedom in selection of parts which can be adopted for a light detection section is increased and monitor light can be detected accurately and reliably and besides monitor light of an intensity suitable for use for bias control can be obtained.

It is another object of the present invention to provide an optical waveguide device and an optical modulator by which bias control can be performed readily and accurately.

In order to attain the objects described above, according to an aspect of the present invention, there is provided an optical waveguide device, comprising a substrate having an electro-optical effect, a plurality of Mach-Zehnder type or directional coupler type optical waveguides formed in series on the substrate, a plurality of electrodes provided independently of each other and individually for the plurality of optical waveguides, and a plurality of light detection sections for detecting the intensity of light emitted from the plurality of optical waveguides independently of each other.

Preferably, the optical waveguide device further comprises a plurality of waveguide type couplers provided individually on the output side of the plurality of optical waveguides, and a plurality of monitoring optical waveguides each connected to one of ports of a corresponding one of the plurality of waveguide type couplers, the plurality of light detection sections detecting the intensity of the monitor light guided by corresponding ones of the monitoring optical waveguides.

Preferably, each of the waveguide type couplers is a 3 dB coupler, and each of the monitoring optical waveguides is connected to one of ports of a corresponding one of the 3 dB couplers.

Also it is preferable that each of the waveguide type couplers is a 1:N coupler, and each of the monitoring optical waveguides is connected to one of ports of a corresponding one of the 1:N couplers. Particularly preferably, the 1:N coupler is a 1:10 coupler.

Preferably, the optical waveguide device further comprises one or a plurality of waveguide type couplers provided on the output side of one of the plurality of optical waveguides, one or a plurality of Y-branch optical waveguides provided on the output side of the other or others of the plurality of optical waveguides, and one or a plurality of monitoring optical waveguides connected to one of ports of the waveguide type coupler or couplers, one of the plurality of light detection sections detecting the intensity of the monitor light guided by the corresponding monitoring optical waveguide while the other light detection section or sections detect the intensity of radiated light radiated from a branch portion of the corresponding Y-branch optical waveguide.

Preferably, all of the plurality of optical waveguides are Mach-Zehnder type optical waveguides having a Y-branch optical waveguide on the output side thereof, and the plurality of light detection sections are arranged at positions displaced from each other in a thicknesswise direction on an output side end face of the substrate so that the intensity of the radiated light radiated from the branch portion of the corresponding Y-branch optical waveguide may be detected.

Also it is preferable that one of the plurality of monitoring optical waveguides is formed so as to extend to a side face of the substrate, and one of the plurality of light detection sections is provided on the side face of the substrate so that the light outputted from the one monitoring optical waveguide may be detected.

Preferably, the substrate is formed from lithium niobate.

According to another aspect of the present invention, there is provided an optical modulator, comprising a substrate having an electro-optical effect, first and second Mach-Zehnder type optical waveguides formed in series on the substrate, a first signal electrode provided for the first Mach-Zehnder type optical waveguide for being supplied with a clock signal, a second signal electrode provided for the second Mach-Zehnder type optical waveguide for being supplied with a data signal, a first bias electrode provided for the first Mach-Zehnder type optical waveguide for applying a bias voltage, a second bias electrode provided for the second Mach-Zehnder type optical waveguide for applying the bias voltage, a first monitoring photo-detector for detecting the intensity of light outputted from the Mach-Zehnder type optical waveguide, and a second monitoring photo-detector for detecting the intensity of light outputted from the second Mach-Zehnder type optical waveguide.

Preferably, the optical modulator further comprises a 3 dB coupler provided on the output side of the first or second Mach-Zehnder type optical waveguide, a monitoring optical waveguide for guiding light branched by the 3 dB coupler from within the light outputted from the first or second Mach-Zehnder optical waveguide as monitor light to the first or second monitoring photo-detector, and an attenuation section for attenuating the monitor light propagating in the monitoring optical waveguide.

According to a further aspect of the present invention, there is provided an optical waveguide device, comprising a substrate having an electro-optical effect, an optical waveguide formed on the substrate, an electrode provided for the optical waveguide, a monitoring optical waveguide for guiding part of light outputted from the optical waveguide as monitor light, an attenuation section provided for the monitoring optical waveguide for attenuating the monitor light, and a light detection section for detecting the intensity of the monitor light guided by the monitoring optical waveguide and attenuated by the attenuation section.

Preferably, the optical waveguide is a Mach-Zehnder type optical waveguide, and the optical waveguide device further comprises a 3 dB coupler provided on the output side of the Mach-Zehnder optical waveguide.

Preferably, the attenuation section is formed from a curved waveguide having a reduced radius of curvature and composing the monitoring optical waveguide.

As an alternative, the attenuation section may be formed from two or more branch portions which compose the monitoring optical waveguide.

As another alternative, the attenuation section may be formed from a 1:N coupler which composes the monitoring optical waveguide.

As a further alternative, the attenuation section may be formed from a beam expansion section provided in the proximity of an end of the monitoring optical waveguide.

Preferably, a beam expansion section is provided in the proximity of an end of the monitoring optical waveguide.

Preferably, the beam expansion section is formed by providing the end of the monitoring optical waveguide at a position spaced by a predetermined distance from an end face or a side face of the substrate.

Alternatively, the beam expansion section may be formed by branching the end of the monitoring optical waveguide into two branches.

According to a still further aspect of the present invention, there is provided an optical waveguide device, comprising a substrate having an electro-optical effect, a plurality of Mach-Zehnder type or directional coupler type optical waveguides formed in series on the substrate, a plurality of electrodes provided independently of each other and individually for the plurality of optical waveguides, a plurality of light detection sections for detecting the intensity of light emitted from the plurality of optical waveguides independently of each other, and a bias control section for controlling, based on the intensity of the light detected by one of the plurality of light detection section, a bias voltage to be applied to one of the electrodes provided for that one of the optical waveguides which corresponds to the one light detection section.

With the optical waveguide devices and the optical modulators, since monitor light is extracted through the monitoring optical waveguide, the monitor light can be detected accurately and reliably. Further, since the attenuation section is provided for the monitoring optical waveguide such that the monitor light attenuated by the attenuation section is detected by the light detection section, there is advantages that the degree of freedom in selection of a part which can be adopted for the light detection section is increased and that monitor light of an intensity suitable for bias control can be obtained.

Further, with optical waveguide devices and the optical modulators, where the optical modulator includes a plurality of Mach-Zehnder type or directional coupler type optical waveguides, the light detection sections provided individually for the optical waveguides detect monitor light independently of each other, and bias control is performed based on the detected monitor lights. Consequently, there is an advantage that the bias control can be performed readily and accurately.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 20(A) and 20(B) are schematic views illustrating bias control in an RZ optical modulator.

DESCRIPTION OF THE PREFERRED EMBODIMENTS

In the following, embodiments of the present invention are described with reference to the drawings.

Description of the First Embodiment

First, an optical waveguide device according to a first embodiment of the present-invention is described with reference to FIGS. 1 to 10.

An optical modulator configured by applying the optical waveguide device of the present invention is described below with reference to FIG. 1.

The present optical modulator is a Mach-Zehnder type optical modulator (MZ type LN optical modulator) in which lithium niobate ($LiNbO_3$; LN) is used. Such an optical modulator as just described is provided, for example, in an optical transmitter.

Figure 1:
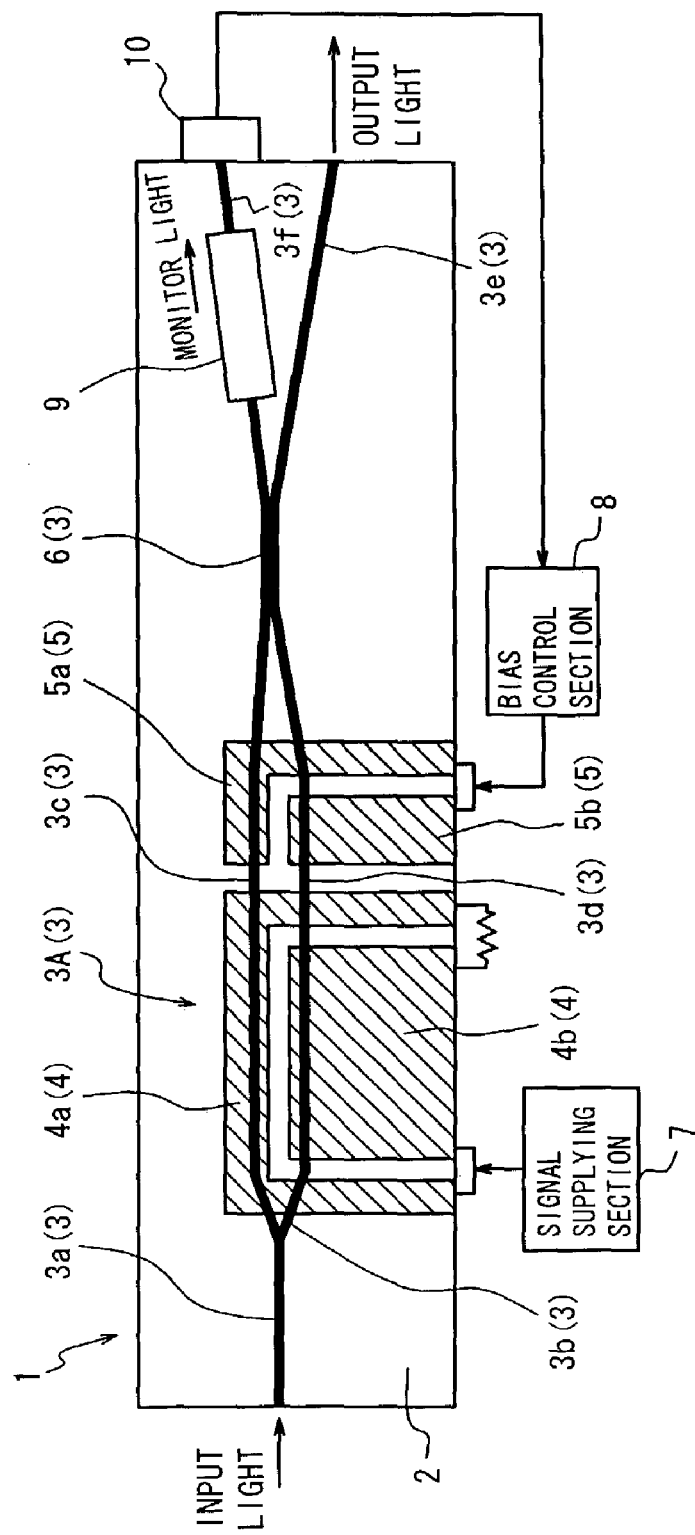
FIG. 1 is a schematic view showing a general configuration of an optical modulator as an optical waveguide device according to a first embodiment of the present invention.

In particular, as shown in FIG. 1, the MZ type LN optical modulator 1 is configured such that an optical waveguide 3 including a Mach-Zehnder interferometer type (Mach-Zehnder type) optical waveguide (MZ type optical waveguide) 3A is formed on a lithium niobate crystal substrate (LN substrate) 2 formed by cutting out lithium niobate crystal in the Z-axis direction of the crystal orientation, and a main electrode 4 for inputting a data signal (main signal) and a bias electrode 5 for applying a bias voltage are formed in the proximity of the MZ type optical waveguide 3A.

It is to be noted here that, while lithium niobate crystal is used for the substrate 2, any material having an electro-optical effect can be used, and for example, some other ferroelectric crystal such as lithium tantalate ($LiTaO_3$; LT) crystal may be used.

The MZ type LN optical modulator 1 in which a substrate having an electro-optical effect, for example, a $LiNbO_3$ crystal substrate, a $LiTaO_3$ crystal substrate or the like is used is formed such that a metal film is formed at part of the substrate formed from, for example, $LiNbO_3$ crystal, $LiTaO_3$ crystal or the like and is thermally diffused into the substrate to form an optical waveguide, or the metal film is patterned and proton exchange is performed in benzoic acid to form an optical waveguide, whereafter electrodes are formed in the proximity of the optical waveguide.

In particular, where, for example, $LiNbO_3$ crystal is used for the substrate, a titanium film (Ti film) is patterned on the substrate so as to have a desired shape of the optical waveguide and then heated for 7 to 10 hours at 1,050° C. to thermally diffuse into the substrate to form the optical waveguide.

In the present embodiment, as shown in FIG. 1, the optical waveguide 3 is formed such that an input side optical waveguide 3a is branched through a Y-branch optical waveguide (branch waveguide) 3b and-coupled to two parallel linear optical waveguides 3c and 3d, and the linear optical waveguides 3c and 3d are coupled to an output side optical waveguide 3e and a monitoring optical waveguide 3f through a 3 dB coupler (waveguide type coupler) 6. It is to be noted that the MZ type optical waveguide 3A is formed from the Y-branch optical waveguide 3b, linear optical waveguides 3c and 3d and 3 dB coupler 6.

The 3 dB coupler 6 is formed as a waveguide type optical coupler (waveguide type coupler). As the 3 dB coupler 6, for example, a symmetrical coupler is used, and generally, a directional coupling type coupler (3 dB directional coupler) of the waveguide type is used. Preferably, a crossover waveguide type coupler having a low wavelength dependence and a high yield (3 dB crossover waveguide type coupler) is used.

In this way, the optical modulator 1 according to present embodiment has a structure wherein one MZ type LN optical modulator 3A and one 3 dB coupler 6 are integrated as a unitary member in one chip.

Further, as shown in FIG. 1, the main electrode 4 includes a signal electrode 4a provided in a partly overlapping relationship with the linear optical waveguide 3c which forms the MZ type optical waveguide 3A and a ground electrode 4b provided in a partly overlapping relationship with the other linear optical waveguide 3d which forms the MZ type optical waveguide 3A. A data signal supplying section (signal supplying section) 7 for -supplying a data signal (main signal) is connected to the signal electrode 4a which forms the main electrode 4.

The data signal is supplied from the data signal supplying section 7 to the main electrode 4 to apply a voltage (data signal voltage) corresponding to the data signal to the linear optical waveguides 3c and 3d, and as a result, an electric field is generated on the linear optical waveguides 3c and 3d to vary the refractivity of them. Consequently, a phase difference is produced between lights which propagate in the linear optical waveguides 3c and 3d, and the lights having the phase difference are multiplexed with each other by the 3 dB coupler 6 so that they interfere with each other. Consequently, output light (a modulation signal) modulated in accordance with the data signal is outputted through the output side optical waveguide 3e.

It is to be noted that, in the present embodiment, as shown in FIG. 1, one end (output side end, terminal end) of the signal electrode 4a and one end (output side end, terminal end) of the ground electrode 4b are connected to each other using a resistor (terminator) to form a travelling wave electrode. Then, a microwave as the data signal (microwave signal, high frequency wave, high frequency signal) is supplied through the data signal supplying section 7 (including a power supply circuit and a driving circuit) connected to the other end (input side end) of the signal electrode 4*a* and the other end (input side end) of the ground electrode 4*b* so that a voltage corresponding to the supplied microwave is applied to the linear optical waveguides 3*c* and 3*d*. In this manner, the present optical modulator 1 can be driven at a high speed.

Particularly, the sectional shape of the main electrode 4 is varied to adjust the effective refractivity of the linear optical waveguides 3*c* and 3*d* thereby to adjust the speed of the lights which propagate in the linear optical waveguides 3*c* and 3*d* and the speed of the microwave to be supplied to the main electrode 4 to each other so that a light response characteristic in a broadband can be obtained.

The bias electrode 5 includes an electrode 5*a* provided in a partly overlapping relationship with the linear optical waveguide 3*c* which forms the MZ type optical waveguide 3A and a ground electrode 5*b* provided in a partly overlapping relationship with the other linear optical waveguide 3*d* which forms the MZ type optical waveguide 3A. Generally, a bias control section (for example, a bias control circuit) 8 is connected to the bias electrode 5.

A bias voltage (DC voltage) is supplied to the bias electrode 5 through the bias control section 8. Consequently, the bias voltage (DC voltage) is applied to the linear optical waveguides 3*c* and 3*d*.

As hereinafter described, feedback control for controlling the bias voltage based on the intensity of monitor light is performed by the bias control section 8 to compensate for the fluctuation of the operating point voltage of the MZ type LN optical modulator 1.

In the present embodiment, a lithium niobate crystal substrate 2 cut in the Z-axis direction is used, and, in order to utilize the refractivity variation by an electric field of the Z-axis direction, the main electrode 4 and the bias electrode 5 are formed just above the linear optical waveguides 3*c* and 3*d*.

In this manner, in the present embodiment, since the main electrode 4 and the bias electrode 5 are patterned just above the linear optical waveguides 3*c* and 3*d*, there is the possibility that the light which propagates in the linear optical waveguides 3*c* and 3*d* may be absorbed by the electrodes 4 and 5. In the present embodiment, in order to prevent the phenomenon just described, a buffer layer is formed between the LN substrate 2 and the electrodes 4 and 5. The buffer layer may be formed as, for example, a $SiO_2$ film, and the thickness thereof maybe approximately 0.2 to 1 µm.

To this end, the optical modulator 1 is formed such that a buffer layer having a small thickness compared with the thickness of the substrate 2 is layered between the main electrode 4 and bias electrode 5 and the substrate 2.

It is to be noted that, in the present embodiment, while the main electrode 4 and the bias electrode 5 are each formed as a single electrode having one signal electrode thereby to form the optical modulator 1 as a single driving type optical modulator, they are not limited to those of the example just described. For example, in order to reduce the drive voltage, each of the main electrode 4 and the bias electrode 5 may be formed as a dual electrode having two signal electrodes thereby to form a dual driving type optical modulator.

Incidentally, in the optical modulator 1 according to the present embodiment, as shown in FIG. 1, the 3 dB coupler 6 is provided on the output side of the MZ type optical waveguide 3A, and the output side optical modulator (optical waveguide for a signal) 3*e* is connected to one of the ports on the output side of the 3 dB coupler 6.

Meanwhile, in the optical modulator 1 according to the present embodiment, as shown in FIG. 1, a monitoring optical waveguide 3*f* is connected to the other port of the output side of the 3 dB coupler 6. The monitoring optical waveguide 3*f* extends to an output end of the optical modulator (chip) 1. Further, as hereinafter described, an attenuation section 9 is provided for the monitoring optical waveguide 3*f*. Furthermore, a monitoring PD (photo detector, bias controlling monitor PD, light detection section) 10 is provided at an end of the monitoring optical waveguide 3*f*. Consequently, output light modulated by the MZ type optical modulator 1 is guided as a complementary signal to that of the output side optical waveguide 3*e* to the monitoring optical waveguide 3*f* by the 3 dB coupler 6 and attenuated by means of the attenuation section 9, and thereafter, the intensity of the monitor light is detected by the monitoring PD 10.

Further, as shown in FIG. 1, the monitoring PD 10 is connected to the bias control section 8 for controlling the bias voltage so that an intensity signal of the monitor light detected by the monitoring PD 10 is transmitted to the bias control section 8. The bias control section 8 performs feedback control for controlling the bias voltage (DC bias voltage) based on the intensity of the monitor light. In particular, the bias control section 8 performs the feedback control of the bias voltage so that a detection value detected by the monitoring PD 10 may approach a target value. Consequently, a variation of the operating point voltage of the optical modulator 1 is compensated for.

Incidentally, as described above, where the 3 dB coupler 6 is provided on the output side of the MZ type optical waveguide 3A to extract the monitor light through the monitoring optical waveguide 3*f* connected to the 3 dB coupler 6, the intensity of the monitor light is equal to the intensity of the output light (signal light) Therefore, the intensity of the monitor light is excessively high. Thus, for example, if the intensity of the input light is very high, then there is possibility that overcurrent may flow into the monitoring PD 10 and break the monitoring PD 10.

Therefore, in the present embodiment, in order to appropriately adjust the intensity of the monitor light, the attenuation section 9 for attenuating the output (power) of the monitor light is provided for the monitoring optical waveguide 3*f* as shown in FIG. 1. Consequently, the output of the monitor light can be attenuated by the attenuation section 9 so that it may be adjusted to an appropriate intensity corresponding to the sensitivity of the monitoring PD 10. Therefore, by the monitoring PD 10, the intensity of the monitor light guided through the monitoring optical waveguide 3*f* and attenuated by the attenuation section 9 is detected.

Examples of a particular configuration of the attenuation section 9 are described below with reference to FIGS. 2 to 9.

Figure 2:
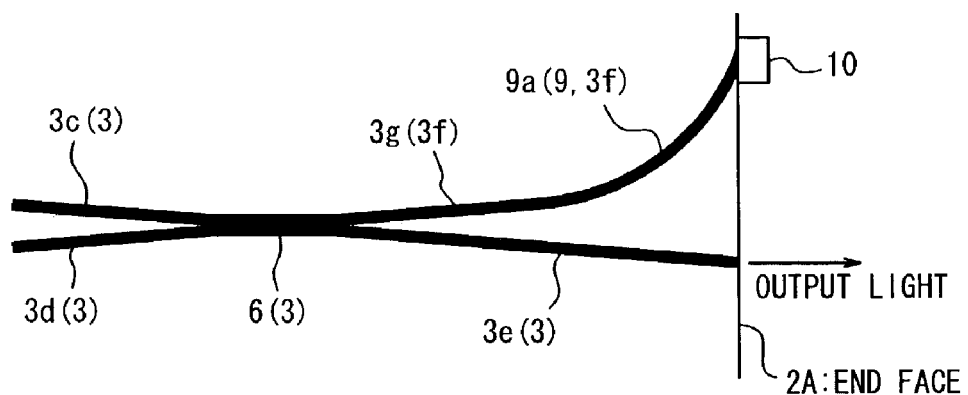
FIGS. 2 to 9 are enlarged views schematically showing different examples of a configuration of an attenuation section provided in the optical modulator as the optical waveguide device according to the first embodiment of the present invention.

(1) As shown in FIG. 2, the attenuation section 9 is formed from a curved waveguide 9*a* (waveguide type attenuator) having a reduced radius of curvature.

In particular, as shown in FIG. 2, an optical waveguide 3*g* which linearly extends from a port of the 3 dB coupler 6 toward an end face 2A of the substrate 2 is formed, and a curved waveguide 9*a* having a radius of curvature reduced by a desired amount compared with that of the linear optical waveguide 3*g* is formed such that it is connected to the linear optical waveguide 3*g*. In this instance, the monitoring optical waveguide 3f is formed from the linear optical waveguide 3g and the curved waveguide 9a.

Figure 3:
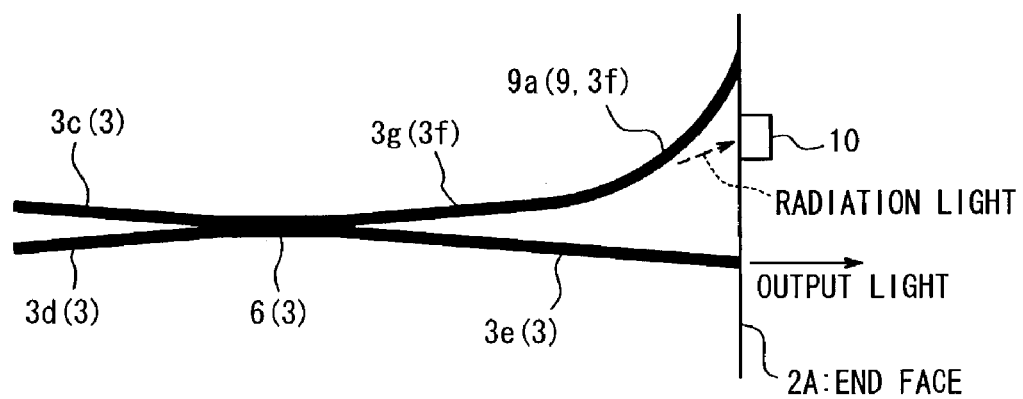

If the monitoring optical waveguide 9 is formed from the curved waveguide 9a having a reduced radius of curvature in this manner, then since some curve loss is produced when the monitor light propagates in the monitoring optical waveguide 9, the output of the monitor light guided by the monitoring optical waveguide 9 is attenuated.

Where the attenuation section 9 is formed from the curved waveguide 9a having a reduced radius of curvature, as shown in FIG. 2, guided light emitted from the end of the curved waveguide 9a may be detected as the monitor light by the monitoring PD 10, or as shown in FIG. 3, radiation light radiated from a curved portion of the curved waveguide 9a may be detected as the monitor light by the monitoring PD 10.

Particularly, where the guided light guided through the curved waveguide 9a is used as the monitor light as shown in FIG. 2, a PD having the low sensitivity can be used as the monitoring PD 10, and there is an advantage that the cost can be suppressed low. While, where radiation light is used as the monitor light as shown in FIG. 3, although a PD having a high sensitivity must be used as the monitoring PD 10, there is an advantage that position adjustment when the PD is attached is easy.

Figure 4:
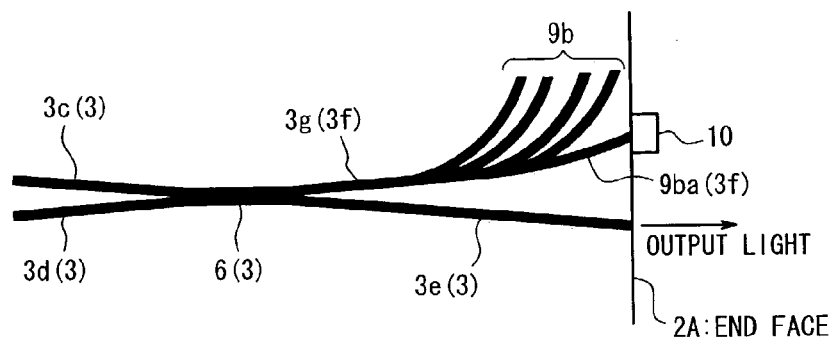

(2) As shown in FIG. 4, the attenuation section 9 is formed from two or more branch optical waveguides (a plurality of branch optical waveguides, multiple branch optical waveguides, waveguide type attenuators) 9b.

In particular, as shown in FIG. 4, an optical waveguide 3g linearly extending from a port of the 3 dB coupler 6 toward the end face 2A of the substrate 2 is formed, and two or more branch optical waveguides 9b are formed such that they are connected to the linear optical waveguide 3g. In this instance, the monitoring optical waveguide 3f is formed from the linear optical waveguide 3g and a branch optical waveguide 9ba from among the two or more optical waveguides 9b.

Where the monitoring optical waveguide 3f includes the two or more branch optical waveguides 9b in this manner, since part of the monitor light is branched at the branch optical waveguides 9b, the output of the monitor light guided in the branch optical waveguide 9ba which forms the monitoring optical waveguide 3f is attenuated.

Figure 5:
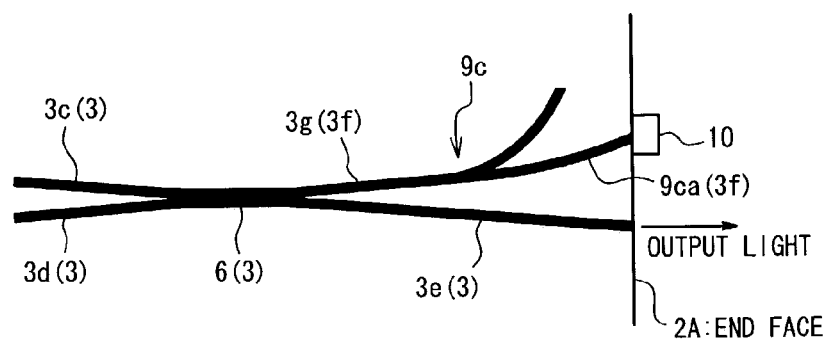

(3) As shown in FIG. 5, the attenuation section 9 is formed at a 1:N coupler (waveguide type coupler, waveguide type attenuator) 9c which branches the monitor light at a predetermined branch ratio of 1:N.

In particular, as shown in FIG. 5, an optical waveguide 3g linearly extending from a port of the 3 dB coupler 6 toward the end face 2A of the substrate 2 is formed, and the waveguide type 1:N coupler (waveguide type coupler) 9c is formed such that it is connected to the linear optical waveguide 3g. In this instance, the monitoring optical waveguide 3f is formed from the linear optical waveguide 3g and an optical waveguide 9ca connected to one of ports of the 1:N coupler 9c.

Where the monitoring optical waveguide 3f includes the 1:N coupler 9c in this manner, since part of the monitor light is branched by the 1:N coupler 9c, the output of the monitor light guided in the optical waveguide 9ca connected to one of the ports of the 1:N coupler 9c which forms the monitoring optical waveguide 3f is attenuated.

Figure 6:
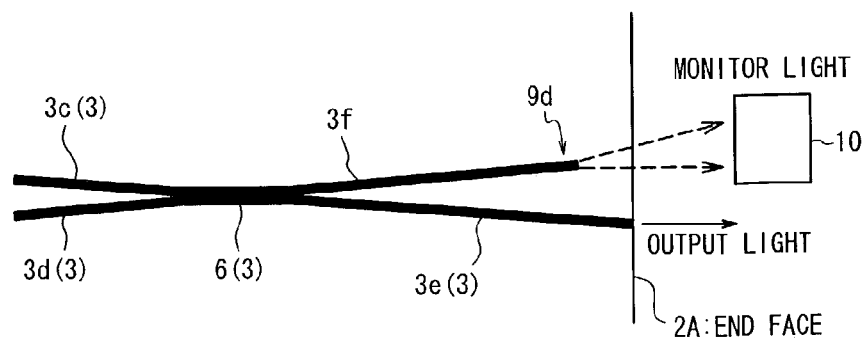
Figure 7:
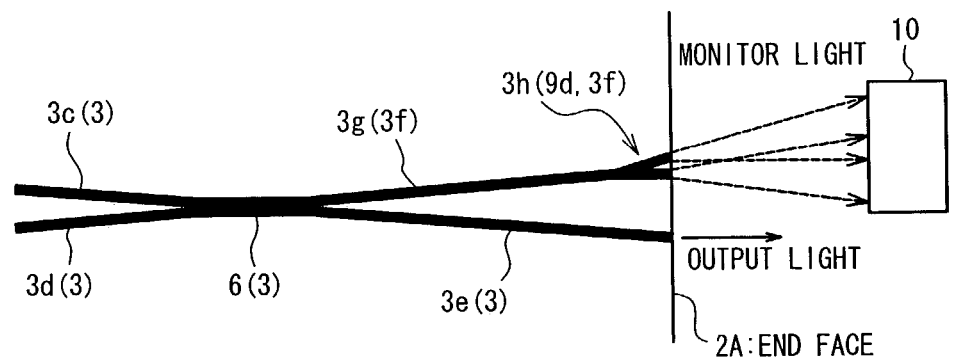

(4) As shown in FIGS. 6 and 7, the attenuation section 9 is formed from a beam expansion section (waveguide type attenuator) 9d provided in the proximity of the end of the monitoring optical waveguide 3f.

For example, as shown in FIG. 6, the beam expansion section 9d is formed from an end of the monitoring optical waveguide 3f formed at a position spaced by a predetermined distance from the end face 2A of the substrate 2 (or, where the monitor light is emitted from the side face of the substrate 2, from the side face of the substrate). It is to be noted that the predetermined distance is set taking the sensitivity of the monitoring PD 10 and so forth into consideration. Here, while the monitoring PD 10 is provided at a position spaced from the end face 2A of the substrate 2, the monitoring PD 10 may otherwise be attached to the end face 2A of the substrate 2.

Where the beam expansion section 9d is formed by cutting the monitoring optical waveguide 3f intermediately in this manner, the monitor light is radiated from the end of the monitoring optical waveguide 3f, and the beam diameter of the monitor light radiated from the end face 2A of the substrate 2 is increased thereby to attenuate the output of the monitor light. Further, since the beam diameter is increased, also the tolerance of the position for providing the monitoring PD 10 can be increased.

Meanwhile, as shown in FIG. 7, the beam expansion section 9d may be formed so that the end of the monitoring optical waveguide 3f is branched to two branches. In particular, an optical waveguide 3g linearly extending from a port of the 3 dB coupler 6 toward the end face 2A of the substrate 2 is formed, and a two-branch optical waveguide 3h is formed such that it is connected to the linear optical waveguide 3g. In this instance, the monitoring optical waveguide 3f is formed from the linear optical waveguide 3g and the two-branch optical waveguide 3h. Here, while the monitor PD 10 is provided at a position spaced from the end face 2A of the substrate 2, it may otherwise be attached to the end face 2A of the substrate 2.

Where the beam expansion section 9d is formed by branching the end of the monitoring optical waveguide 3f to two branches in this manner, the monitor light is branched by the two-branch optical waveguide 3h and emitted from each of the branched optical waveguides. Consequently, the emission area of the monitor light is expanded and the output of the monitor light is attenuated. Further, since the emission area of the monitor light is expanded, also the tolerance of the position for providing the monitoring PD 10 can be increased.

(5) The attenuation section 9 is formed such that the attenuation schemes described above are optionally combined.

Figure 8:
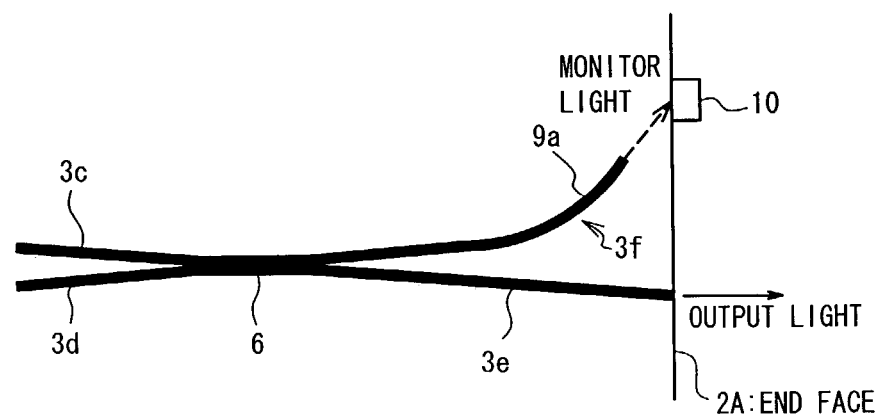
Figure 9:
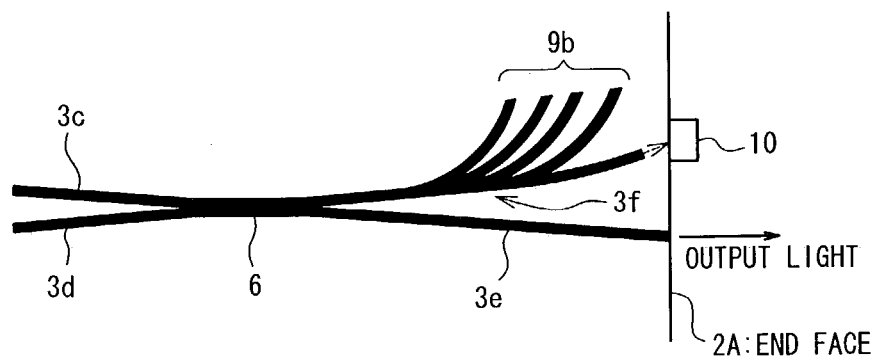
Figure 10:
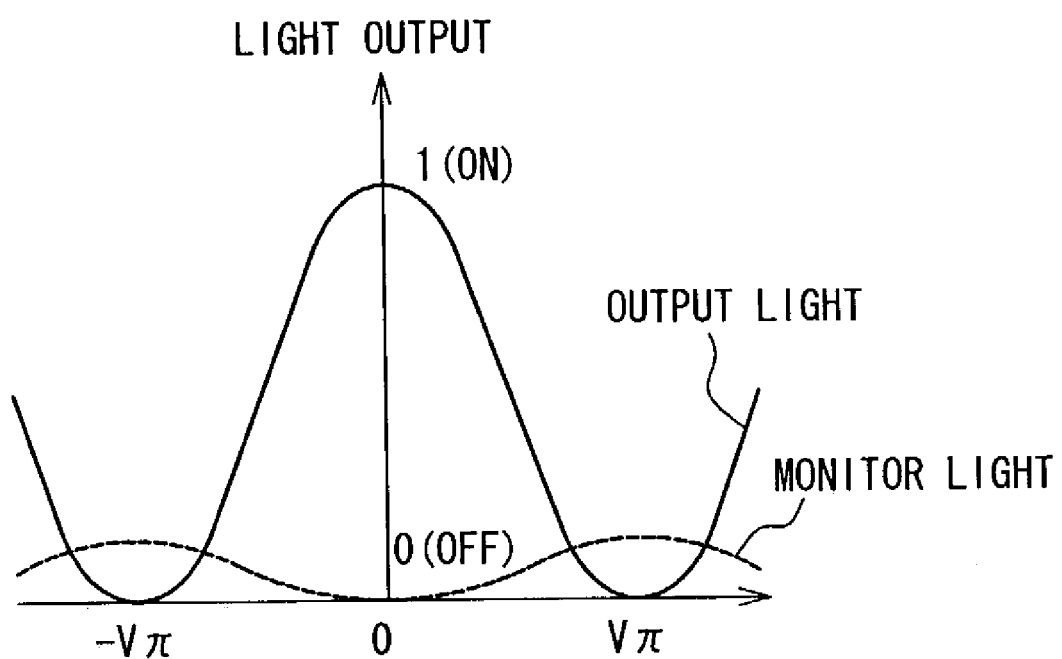
FIG. 10 is a diagrammatic view illustrating light outputs of signal light and monitor light of the optical modulator as the optical waveguide device according to the first embodiment of the present invention.

In particular, for example, as shown in FIG. 8, the attenuation section 9 is formed such that the curved waveguide 9a having a reduced radius of curvature is provided and the end of the monitoring optical waveguide 3f is cut intermediately so as to have the position of the predetermined distance from the end face 2A of the substrate 2. Further, for example, as shown in FIG. 9, the attenuation section 9 is formed such that the two or more branch optical waveguides 9b are provided and the end of the monitoring optical waveguide 3f is cut intermediately so as to have the position of the predetermined distance from the end face 2A of the substrate 2. Where the attenuation methods described above are combined in this manner, even if the output of the monitor light is high, the output of the monitor light can be attenuated certainly.

Where the attenuation section 9 is provided in the monitoring optical waveguide 3f of the optical modulator 1, the output power of the monitor light can be suppressed low in comparison with the output power of the output light to be emitted from the output side optical waveguide 3e as shown in FIG. 10.

Accordingly, with the optical modulator 1 as the optical waveguide device according to the present embodiment, the 3 dB coupler 6 is provided on the output side of the Mach-Zehnder type optical waveguide 3A, and the monitoring optical waveguide 3f is formed as the optical waveguide connected to one of ports on the output side of the 3 dB coupler 6. Further, in order to extract the monitor light, the attenuation section 9 is provided for the monitoring optical waveguide 3f. Therefore, the intensity of the monitor light can be adjusted to a suitable intensity corresponding to the sensitivity of the monitoring PD 10.

Therefore, with the optical waveguide device (optical modulator), there are advantages that the monitor light can be detected accurately and reliably, and the degree of freedom in selection of the monitoring PD 10 which may be applied to the optical waveguide device increases, and besides, monitor light having a suitable intensity for use for the bias control can be obtained.

It is to be noted that, while in the embodiment described above, the optical waveguide device according to the present invention is applied to the Mach-Zehnder type optical modulator 1, the application thereof is not limited to this and the optical waveguide device can be applied also to an optical modulator having a different waveguide structure such as, for example, an optical modulator which includes a directional coupler type optical waveguide.

Further, while, in the embodiment described above, the case wherein the optical waveguide device according to the present invention is applied to an optical modulator is described, the application of the optical waveguide is not limited to the example just described and the present invention can be applied to a different optical waveguide device such as, for example, a light switch.

Further, while, in the embodiment described above, the configuration wherein part of output light to be outputted from the optical modulator is extracted as the monitor light to detect the intensity thereof to perform the feedback control of the bias voltage is applied, the present invention is not limited to the example just described, and for example, a configuration wherein the intensity of the detected monitor light is used for feedback control of a voltage to be applied by a signal supplying section.(in which also a power supply circuit and a drive circuit are included) may be applied.

Further, while, in the embodiment described above, the optical modulator is configured including the main electrode 4 and the bias electrode 5, the present invention is not limited to the example just described, and for example, a configuration wherein the optical modulator is configured including only the main electrode 4 and the bias voltage is applied to the main electrode 4 whereas a data signal is supplied to the main electrode 4 may be applied.

Description of the Second Embodiment

An optical waveguide device according to a second embodiment of the present invention is described below.

An RZ (Return to Zero) optical modulator to which the optical waveguide device of the present invention is applied [that is, an optical modulator (clock modulation type optical modulator) which applies a clock signal and a data signal to input light to produce an RZ signal] is described below with reference to FIGS. 11 to 17.

The RZ optical modulator according to the present embodiment is used, for example, as an optical transmitter in a long distance optical transmission system.

Figure 11:
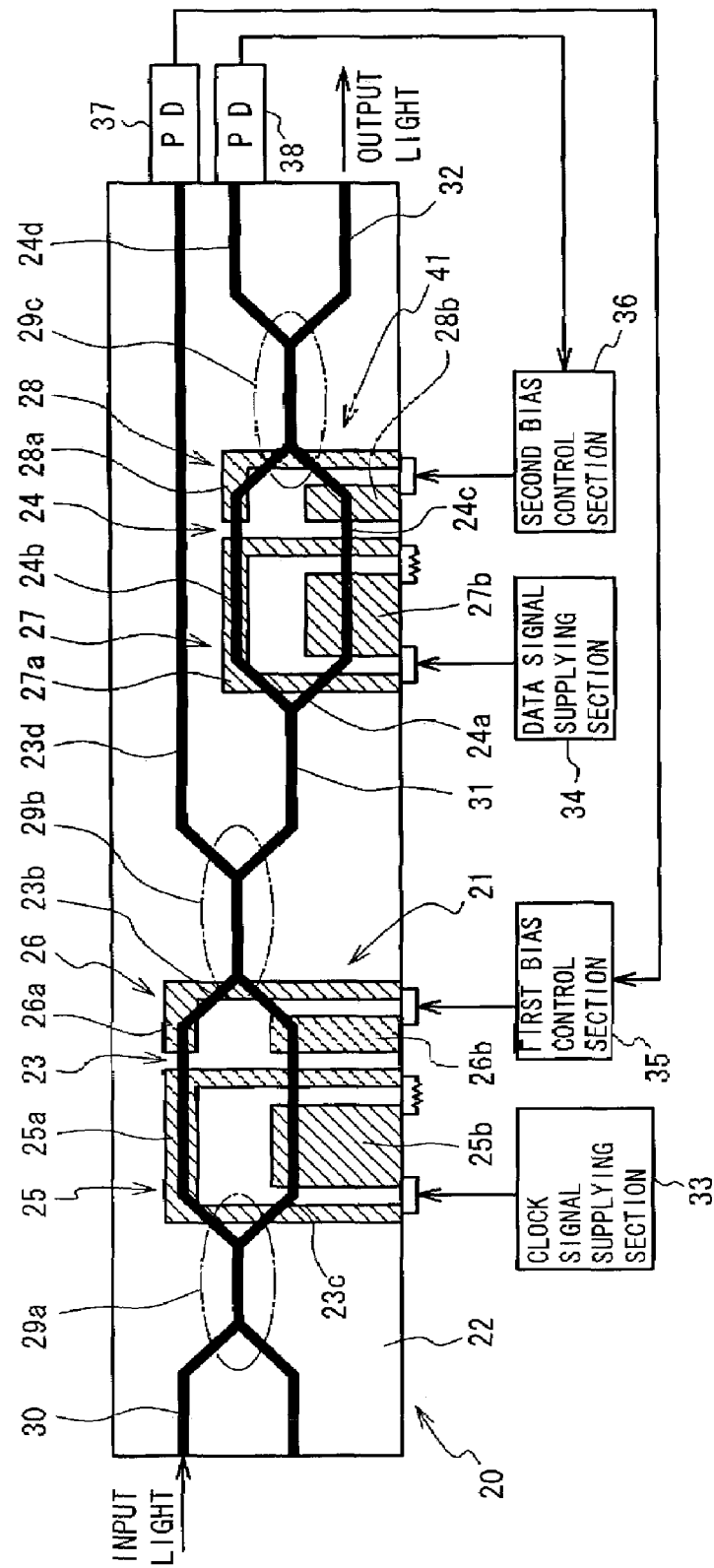
FIG. 11 is a schematic view showing a general configuration of an RZ optical modulator as an optical waveguide device according to a second embodiment of the present invention.

In the present embodiment, as shown in FIG. 11, the RZ optical modulator 20 includes two-stage Mach-Zehnder type optical modulators (MZ type LN optical modulators) 21 and 41 for which lithium niobate (LiNbO$_3$; LN) is used.

In particular, as shown in FIG. 11, the RZ optical modulator 20 is configured such that optical waveguides including a first Mach-Zehnder type optical waveguide (hereinafter referred to as first optical waveguide) 23 and a second Mach-Zehnder type optical waveguide (hereinafter referred to as second optical waveguide) 24 are formed on a lithium niobate crystal substrate (LN substrate) 22 formed by cutting out lithium niobate crystal in the Z-axis direction of the crystal orientation (Z-axis cutting), and a first electrode (main electrode) 25 and a first bias electrode 26 are formed in the proximity of the first optical waveguide 23 while a second electrode (main electrode) 27 and a second bias electrode 28 are formed in the proximity of the second optical waveguide 24.

It is to be noted that the first Mach-Zehnder type optical modulator 21 (also called clock modulator because it modulates an inputted signal to a clock signal) includes the first optical waveguide 23, first electrode 25 and first bias electrode 26 which are provided on the preceding stage side of the RZ optical modulator 20. Further, the second Mach-Zehnder type optical modulator (also called NRZ modulator because it modulates an inputted signal to an NRZ (Non Return to Zero) signal) 41 includes the second optical waveguide 24, second electrode 27 and second bias electrode 28 which are provided on the succeeding stage side of the RZ optical modulator 20.

It is to be noted here that, while lithium niobate crystal is used for the substrate, any material having an electro-optical effect can be used, and, for example, some other ferroelectric crystal such as lithium tantalate (LiTaO$_3$; LT) crystal may be used.

The RZ optical modulator 1 in which a substrate having an electro-optical effect such as, for example, a LiNbO$_3$ crystal substrate, a LiTaO$_3$ crystal substrate or the like is used is formed such that a metal film is formed at part of a substrate formed from, for example, LiNbO$_3$ crystal, LiTaO$_3$ crystal or the like and is thermally diffused into the substrate to form an optical waveguide, or the metal film is patterned and proton exchange is performed in benzoic acid to form an optical waveguide, whereafter electrodes are formed in the proximity of the optical waveguide.

In particular, where, for example, LiNbO$_3$ crystal is used for the substrate, a titanium film (Ti film) is patterned on the substrate so as to have a desired shape of the optical waveguides and then heated for 7 to 10 hours at 1,050° C. to thermally diffuse into the substrate to form the optical waveguides.

In the present embodiment, as shown in FIG. 11, the optical waveguides are formed such that an input side optical waveguide 30 is branched through a symmetrical 3 dB coupler (optical coupler, waveguide type coupler) 29a and connected to two parallel linear optical waveguides 23b and 23c. Further, the linear optical waveguides 23b and 23c are connected to an intermediate optical waveguide 31 and a monitoring optical waveguide 23d through a symmetrical 3 dB coupler (optical coupler, waveguide type coupler) 29b. In the present embodiment, couplers having a same shape are used for the 3 dB couplers 29a and 29b. It is to be noted that the Mach-Zehnder type first optical waveguide 23 is formed from the 3 dB coupler 29a, linear optical waveguides 23b and 23c, and 3 dB coupler 29b.

Further, as shown in FIG. 11, the intermediate optical waveguide 31 is branched through a Y-branch optical waveguide (branch optical waveguide) 24a and connected to two parallel linear optical waveguides 24b and 24c. Further, the linear optical waveguides 24b and 24c are connected to an output side optical waveguide 32 and a monitoring optical waveguide 24d through a symmetrical 3 dB coupler (optical coupler, waveguide type coupler) 29c. It is to be noted that the Mach-Zehnder type second optical waveguide 24 is formed from the Y-branch optical waveguide 24a, linear optical waveguides 24b and 24c, and 3 dB coupler 29c.

In the present embodiment, the 3 dB couplers 29a to 29c which form the first and second optical waveguides 23 and 24 are formed as waveguide type optical couplers (waveguide type coupler). For the 3 dB couplers 29a to 29c, generally a directional coupler type coupler (3 dB directional coupler) is used, but preferably, a crossover waveguide type coupler having a low wavelength dependence and a high yield (3 dB crossover waveguide type coupler) is used.

In this way, the RZ optical modulator 20 of the present embodiment has a structure wherein the two MZ type LN optical modulators 21 and 41 and the three 3 dB couplers 29a to 29c are integrated as a unitary member in one chip.

Further, as shown in FIG. 11, the first electrode 25 includes a signal electrode 25a provided in a partly overlapping relationship with the linear optical waveguide 23b which forms the first optical waveguide 23 and a ground electrode 25b provided in a partly overlapping relationship with the other linear optical waveguide 23c which forms the first optical waveguide 23. A clock signal supplying section (signal supplying section) 33 for supplying a sine wave electric signal (microwave signal, high-frequency signal) having, for example, a frequency of 20 GHz as a clock signal is connected to the signal electrode 25a which forms the first electrode 25.

A clock signal is supplied from the clock signal supplying section 33 to the first electrode 25 so that a voltage (clock signal voltage, signal voltage) corresponding to the clock signal is applied to the linear optical waveguides 23b and 23c to generate an electric field in the linear optical waveguides 23b and 23c thereby to vary the refractive index thereof like +Δn or −Δn. Consequently, a phase difference is produced between lights propagating in the linear optical waveguides 23b and 23c, and the lights having the phase difference are multiplexed with each other by the 3 dB coupler 29b so that they interfere with each other. Consequently, a light clock signal [that is, a modulation signal modulated into an RZ data signal (light RZ signal) of 40 Gb/s having a data array of [1], [1], [1], . . . ] of, for example, 40 GHz is outputted to the second optical waveguide 24 through the intermediate optical waveguide 31.

It is to be noted that, in the present embodiment, one of ends (that is, an output side end, terminal end) of the signal electrode 25a and one of ends (that is, an output side end, terminal end) of the ground electrode 25b are connected to each other through a resistor (terminator) to form a travelling wave electrode, and the clock signal is supplied through the clock signal supplying section 33 (including a power supply circuit and a drive circuit) connected to the other end (input side end) of the signal electrode 25a and the other end (input side end) of the ground electrode 25b so that a voltage corresponding to the supplied clock signal is applied to the linear optical waveguide 23b and 23c. In this manner, the first optical modulator 21 can be driven at a high speed.

Particularly where the sectional face shape of the first electrode 25 is varied to control the effective refractive index of the linear optical waveguides 23b and 23c and the speeds of the lights propagating in the linear optical waveguides 23b and 23c and the microwave supplied to the first electrode 25 are controlled to conform with each other, a light response characteristic in a broadband can be obtained.

Similarly, as shown in FIG. 11, also the second electrode 27 includes a signal electrode 27a provided in a partly overlapping relationship with the linear optical waveguide 24b which forms the second optical waveguide 24 and a ground electrode 27b provided in a partly overlapping relationship with the other linear optical waveguide 24c which forms the second optical waveguide 24. An NRZ data signal supplying section (signal supplying section) 34 for supplying, for example, a 40 Gb/s NRZ data signal (electric signal) at a timing synchronized with, for example, a 40 GHz light clock signal from the first optical modulator 21 is connected to the signal electrode 27a which forms the second electrode 27.

An NRZ data signal is supplied from the NRZ data signal supplying section 34 to the second electrode 27 so that a voltage (NRZ data signal voltage, signal voltage) corresponding to the NRZ data signal is applied to the linear optical waveguides 24b and 24c to generate an electric field in the linear optical waveguides 24b and 24c thereby to vary the refractive index thereof like +Δm or −Δm. Consequently, a phase difference is produced between the lights propagating in the linear optical waveguides 24b and 24c, and the lights having the phase difference are multiplexed with each other by the 3 dB coupler 29c so that they interfere with each other. As a result, a light RZ data signal (modulation signal) of, for example, 40 Gb/s is outputted through the output side optical waveguide 32.

It is to be noted that, in the present embodiment, one of ends (that is, an output side end, terminal end) of the signal electrode 27a and one of ends (that is, an output side end, terminal end) of the ground electrode 27b are connected to each other through a resistor (terminator) to form a travelling wave electrode, and the NRZ data signal is supplied through the NRZ data signal supplying section 34 (including a power supply circuit and a drive circuit) connected to the other end (input side end) of the signal electrode 27a and the other end (input side end) of the ground electrode 27b so that a voltage corresponding to the NRZ data signal is applied to the linear optical waveguides 24b and 24c. In this manner, the second optical modulator 41 can be driven at a high speed.

Particularly where the sectional face shape of the second electrode 27 is varied to control the effective refractive index of the linear optical waveguides 24b and 24c and the speeds of the lights propagating in the linear optical waveguides 24b and 24c and the microwave supplied to the second electrode 27 are controlled to conform with each other, a light response characteristic in a broadband can be obtained.

Further, as shown in FIG. 11, the first bias electrode 26 includes an electrode 26a provided in a partly overlapping relationship with the linear optical waveguide 23b which forms the first optical waveguide 23 and a ground electrode 26b provided in a partly overlapping relationship with the other linear optical waveguide 23c which forms the first optical waveguide 23. A first bias control section (for example, a bias control circuit) 35 is connected to the first bias electrode 26.

The bias voltage (DC voltage) is supplied to the first bias electrode 26 by the first bias control section 35 so that it is applied to the first optical waveguide 23.

In the present embodiment, as hereinafter described, feedback control for controlling the bias voltage based on the intensity of the monitor light is performed by the first bias control section 35 so that a variation of the operating point of the first optical modulator 21 is compensated for.

Similarly, as shown in FIG. 11, the second bias electrode 28 includes an electrode 28a provided in a partly overlapping relationship with the linear optical waveguide 24b which forms the second optical waveguide 24 and a ground electrode 28b provided in a partly overlapping relationship with the other linear optical waveguide 24c which forms the second optical waveguide 24. A second bias control section (bias control circuit) 36 is connected to the second bias electrode 28.

The bias voltage (DC voltage) is supplied to the second bias electrode 28 through the second bias control section 36 so that it is applied to the second optical waveguide 24.

In the present embodiment, as hereinafter described, feedback control for controlling the bias voltage based on the intensity of the monitor light is performed by the second bias control section 36 so that a variation of the operating point voltage of the second optical modulator 41 is compensated for.

In the present embodiment, in order to utilize a refractive index variation by the electric field in the Z-axis direction, a Z-axis cut lithium niobate crystal substrate 22 is used, and the first electrode 25 and the first bias electrode 26 are formed just above the linear optical waveguides 23b and 23c of the first optical waveguide 23 while the second electrode 27 and the second bias electrode 28 are formed just above the linear optical waveguides 24b and 24c of the second optical waveguide 24.

In this manner, since, in the present embodiment, the first electrode 25, first bias electrode 26, second electrode 27, and second bias electrode 28 are patterned just above the linear optical waveguides 23b, 23c, 24b, and 24c, there is the possibility that lights which propagate in the linear optical waveguides 23b, 23c, 24b, and 24c may be absorbed by the electrodes 25, 26, 27, and 28. In the present embodiment, in order to prevent the phenomenon just described, a buffer layer is formed between the LN substrate 22 and the electrodes 25, 26, 27 and 28. The buffer layer may be formed as, for example, a $SiO_2$ film, and the thickness thereof may be set to approximately 0.2 to 1 μm.

To this end, the RZ optical modulator 20 is formed such that a buffer layer having a smaller thickness than that of the substrate 22 is layered between the substrate 22 and the first and second electrodes 25 and 27 and first and second bias electrodes 26 and 28.

It is to be noted that, while, in the present embodiment, the first and second electrodes 25 and 27 and the first and second bias electrodes 26 and 28 are individually formed as single electrodes having a signal electrode and form the RZ optical modulator 20 as a single drive type optical modulator, the configuration of the optical modulator is not limited to this. For example, in order to reduce a drive voltage, the electrodes described above may each be formed as a dual electrode having two signal electrodes so that the RZ optical modulator 20 may be formed as a dual drive type optical modulator.

Incidentally, in the present embodiment, as shown in FIG. 11, the 3 dB coupler 29b is provided on the output side of the first optical waveguide 23, and the input side of the second optical waveguide 24, that is, the Y branch optical waveguide 24a of the second optical waveguide 24, is connected to an output side port of the 3 dB coupler 29b through the intermediate optical waveguide 31. In other words, the first optical modulator 21 and the second optical modulator 41 are connected in series along the optical wave guiding direction.

It is to be noted here that, while, in the present embodiment, the two optical modulators 21 and 41 are connected in series along the optical wave guiding direction, the number of such optical modulators is not limited to this. In other words, any plural number of optical modulators may be connected in series. In this instance, a plurality of monitor PDs and a plurality of signal supplying sections are provided.

Consequently, input light from a light source (semiconductor laser) not shown is introduced to the first optical waveguide 23 through the input side optical waveguide 30 and the 3 dB coupler 29a and is modulated based on a desired clock signal (electric signal) upon propagating in the first optical waveguide 23. Thereafter, the modulated light is guided to the second optical waveguide 24 through the 3 dB coupler 29b provided on the output side of the first optical waveguide 23 and the intermediate optical waveguide 31 connected to a port on the output side of the 3 dB coupler 29b and is further modulated in the second optical waveguide 24 based on the NRZ data signal (electric signal). Then, the modulated output light (signal light, optical NR signal) is outputted through the 3 dB coupler 29c and the output side optical waveguide 32 connected to a port on the output side of the 3 dB coupler 29c.

In the present embodiment, as shown in FIG. 11, the first monitoring optical waveguide 23d is connected to the other port of the 3 dB coupler 29b provided on the output side of the first optical waveguide 23 and extends to an output end of the RZ optical modulator (chip) 20. Further, a first monitoring PD (photo detector, first bias controlling monitoring PD, light detection section, light detector) 37 is provided at an end of the first monitoring optical waveguide 23d. Consequently, part of the light modulated by the first optical modulator 21 is branched as monitor light by the 3 dB coupler 29b and is guided to the first monitoring optical waveguide 23d, and the intensity of the monitor light is detected by the first monitoring PD 37.

Further, as shown in FIG. 11, the first monitoring PD 37 is connected to the first bias control section 35 for performing control of the bias voltage so that an intensity signal of the monitor light detected by the first monitoring PD 37 is transmitted to the first bias control section 35. Then, the first bias control section 35 performs feedback control for controlling the bias voltage (DC bias voltage) based on the intensity of the monitor light. In particular, the first bias control section 35 performs the feedback control of the bias voltage so that a detection value detected by the first monitoring PD 37 may approach a target value. Consequently, a variation of an operating point voltage of the first optical modulator 21 is compensated for.

Meanwhile, the second monitoring optical waveguide 24d is connected to the other port of the 3 dB coupler 29c provided on the output side of the second optical waveguide 24 and extends to an output end of the RZ optical modulator (chip) 20. Further, the second monitoring PD (photo detector, second bias controlling monitoring PD, light detection section, light detector) 38 is provided at an end of the second monitoring optical waveguide 24d. Consequently, part of the light modulated by the second optical modulator 41 is branched as monitor light by the 3 dB coupler 29c and is guided to the second monitoring optical waveguide 24*d*, and the intensity of the monitor light is detected by the second monitoring PD 38.

Further, as shown in FIG. 11, the second monitoring PD 38 is connected to the second bias control section 36 for performing control of the bias voltage so that an intensity signal of the monitor light detected by the second monitoring PD 38 is transmitted to the second bias control section 36. The second bias control section 36 performs feedback control for controlling the bias voltage (DC bias voltage) based on the intensity of the monitor light. In particular, the second bias control section 36 performs the feedback control of the bias voltage so that a detection value detected by the second monitoring PD 38 may approach a target value. Consequently, a variation of the operating point voltage of the second optical modulator 41 is compensated for.

In this manner, in the present embodiment, part of light (signal light) modulated by the first optical modulator 21 is extracted as monitor light, and the intensity of this monitor light is detected by the first monitoring PD 37. Further, independently of the process just described, part of light (signal light) modulated by the second optical modulator 41 is extracted as monitor light, and the intensity of this monitor light is detected by the second monitoring PD 38.

Further, the first monitoring PD 37 and the second monitoring PD 38 are connected to the bias control sections 35 and 36, respectively. In particular, the first monitoring PD 37 is connected to the first bias control section 35 for performing bias control of the first optical modulator 21, and the second monitoring PD 38 is connected to the second bias control section 36 for performing bias control of the second optical modulator 41.

Consequently, the feedback control of the bias voltage performed for compensating for a variation of the operating point voltage of the first optical modulator 21 and the feedback control of the bias voltage performed for compensating for a variation of the operating point voltage of the second optical modulator 41 are performed independently of each other.

Accordingly, with the RZ optical modulator 20 as the optical waveguide device according to the present embodiment, since the lights modulated by the optical modulators 21 and 41 are monitored independently of each other by the first and second monitoring PD 37 and 38 provided for the optical modulators 21 and 41, respectively, there is an advantage that the bias control of the optical modulators 21 and 41 can be performed easily and accurately.

It is to be noted that, while, in the present second embodiment, the first and second optical modulators 21 and 41 are formed each as a Mach-Zehnder type optical modulator, the optical modulators are not limited to this, and they may otherwise be formed each as, for example, a directional coupler type optical modulator.

Further, while, in the present second embodiment, the Y branch optical waveguide 24*a* is provided on the input side of the second optical modulator 21, the device to be provided on the input side of the second optical modulator 21 is not limited to this, and for example, a 3 dB coupler may be provided.

Further, while, in the present second embodiment, the 3 dB couplers 29*a* and 29*b* are provided on the incoming and outgoing sides of the first optical modulator 21, respectively, and the 3 dB coupler 29*c* is provided on the outgoing side of the second optical modulator 41, the devices to be provided on the incoming and outgoing sides of them are not limited to a 3 dB coupler, and for example, a Y branch optical waveguide may be provided instead.

Description of the First Modification to the Second Embodiment

An RZ optical modulator as an optical waveguide device according to a first modification to the second embodiment of the present invention is described below with reference to FIG. 12.

The RZ optical modulator according to the present first modification is different from the RZ optical modulator of the second embodiment described above in the configuration of the first monitoring optical waveguide connected to the 3 dB coupler 29*b* provided on the output side of the first optical waveguide 23 and the position at which the first monitoring PD 37 used for bias control of the first optical modulator 21 is provided.

Figure 12:
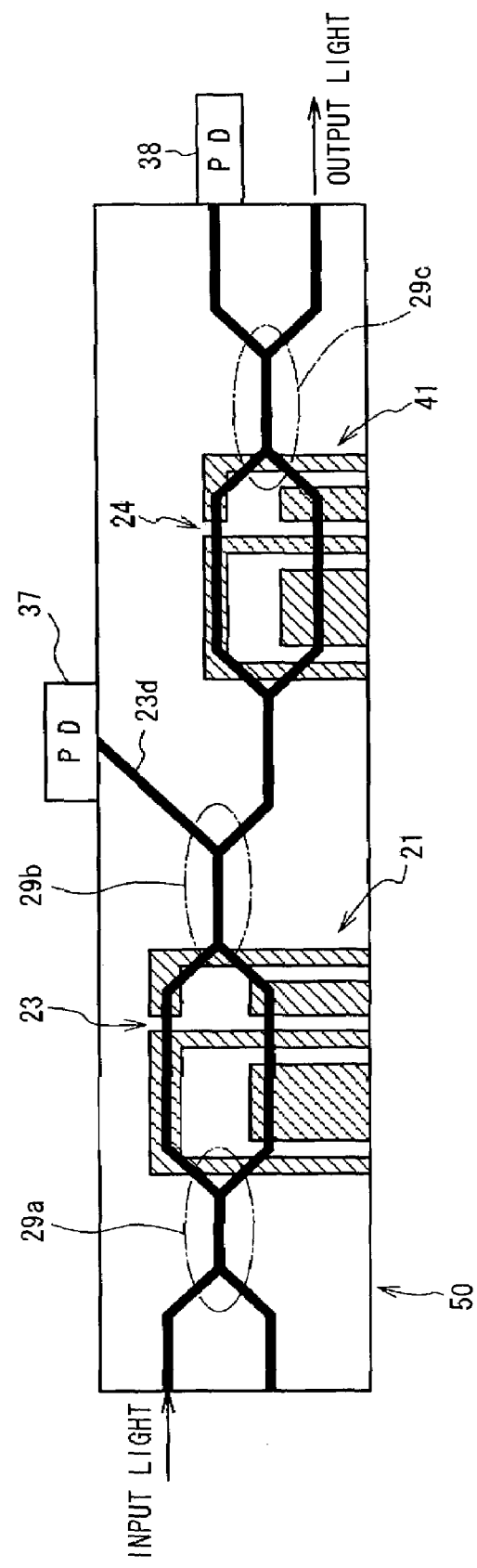
FIG. 12 is a schematic view showing a general configuration of an RZ optical modulator as an optical waveguide device according to a first modification to the second embodiment of the present invention.

In particular, in the present first modification, as shown in FIG. 12, a first monitoring optical waveguide 23*d* connected to the other port on the output side of the 3 dB coupler 29*b* provided on the output side of the first optical waveguide 23 is formed so as to extend to a side face of an RZ optical modulator 50 (chip), and a first monitoring PD (light detection section) 37 is provided at an end of the first monitoring optical waveguide 23*d* extending to the side face of the RZ optical modulator 50.

It is to be noted that, since the configuration of the remaining portion is similar to that of the second embodiment described above, description thereof is omitted here.

In this manner, the present first modification achieves not only the effects achieved by the configuration of the second embodiment described above but also an advantage that, since the first monitoring PD 37 can be provided on the side face of the RZ optical modulator 20, the degree of freedom in location of the first and second monitoring PDs 37 and 38 increases.

Description of the Second Modification to the Second Embodiment

An RZ optical modulator as an optical waveguide device according to a second modification to the second embodiment of the present invention is described below with reference to FIG. 13.

The RZ optical modulator according to the present second modification is different from the RZ optical modulator of the second embodiment described above in the monitoring method of light outputted from the second optical modulator 41. Therefore, the configuration of the output side of the second optical waveguide 24 differs, and also the position at which the second monitoring PD (light detection section) 38 used for bias control of the second optical waveguide 24 is provided differs.

Figure 13:
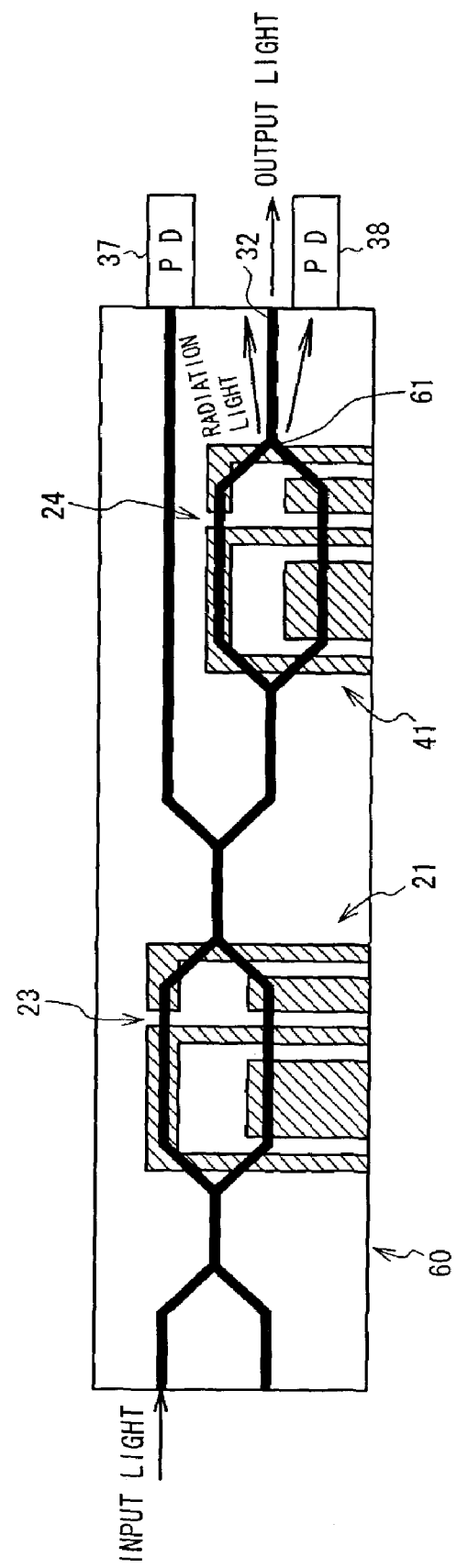
FIG. 13 is a schematic view showing a general configuration of an RZ optical modulator as an optical waveguide device according to a second modification to the second embodiment of the present invention.
Figure 14:
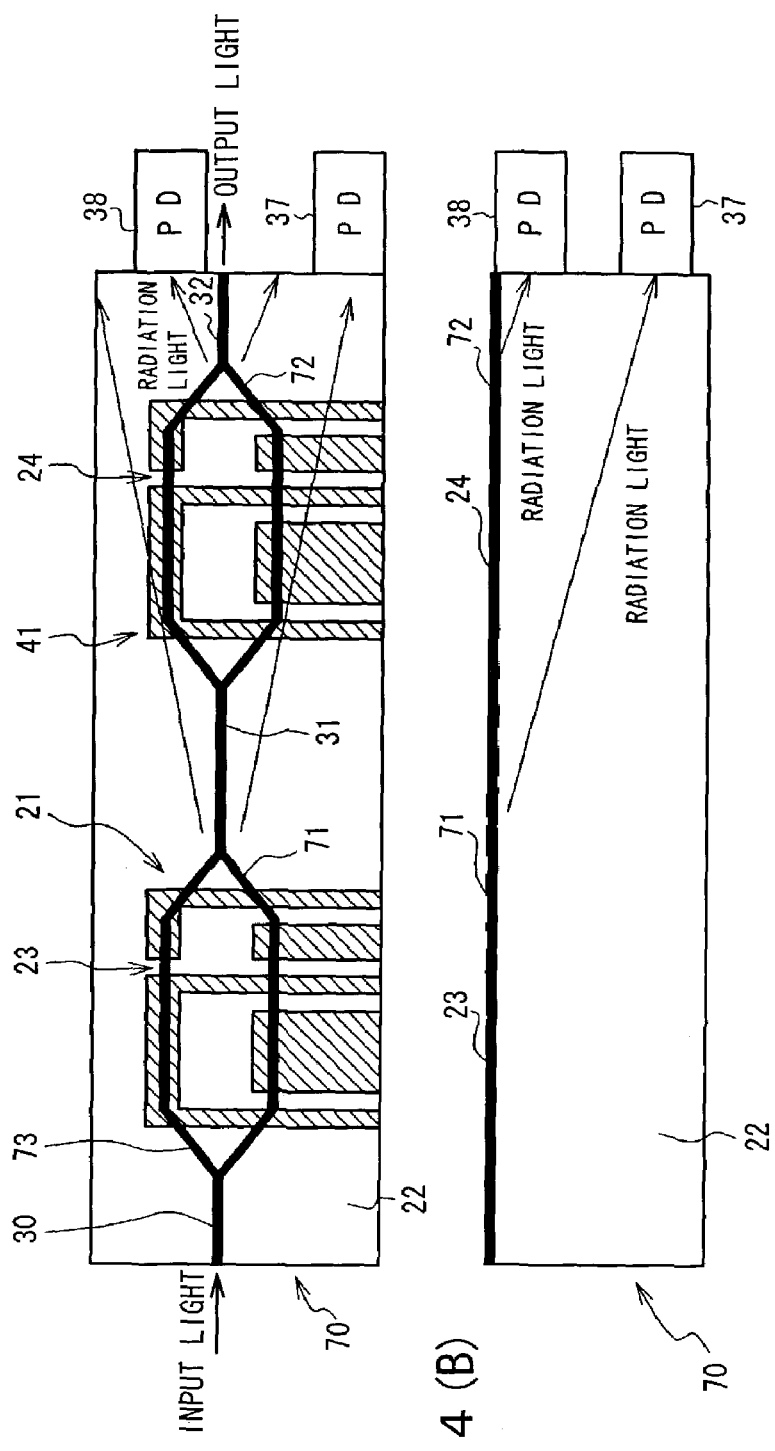
FIGS. 14(A) and 14(B) are schematic views showing a general configuration of an RZ optical modulator as an optical waveguide device according to a third modification to the second embodiment of the present invention.

In particular, as shown in FIG. 13, in the RZ optical modulator 60 according to the present second modification, a Y branch optical waveguide 61 is provided on the output side of the second optical waveguide 24 and connected to an output side optical waveguide 32 so that output light form the second optical waveguide 24 is outputted through the Y branch optical waveguide 61 and the output side optical waveguide 32. Further, radiation light radiated from a branch portion of the Y branch optical waveguide 61 in an off state is used as monitor light. Therefore, the second monitoring PD 38 is provided at a position on an end face on the output side of the RZ optical modulator (chip) 60 such that the intensity of the radiation light from the branch portion of the Y branch optical waveguide 61 can be detected.

It is to be noted that, since the configuration of the remaining portion is similar to that of the second embodiment described above, description thereof is omitted here.

In this manner, the present second modification not only achieves the effects achieved by the configuration of the second embodiment described above but also can provide an increased tolerance to the location of the second monitoring PD 38.

Description of the Third Modification to the Second Embodiment

Now, an RZ optical modulator as an optical waveguide device according to a third modification to the second embodiment of the present invention is described below with reference to FIGS. 14(A) and 14(B). It is to be noted that FIG. 14(A) is a schematic plan view, and FIG. 14(B) is a schematic sectional view.

The RZ optical modulator according to the present third modification is different from the RZ optical modulator of the second embodiment described above in the monitoring method of light outputted from the first optical modulator 21 and the second optical modulator 41. Therefore, the configuration of the output side of the first optical waveguide 23 and the second optical waveguide 24 differs, and also the position at which the first monitoring PD (light detection section) 37 used for bias control of the first optical waveguide 23 is provided and the position at which the second monitoring PD (light detection section) 38 used for bias control of the second optical waveguide 24 is provided differ.

In particular, as shown in FIGS. 14(A) and 14(B), in the RZ optical modulator 70 according to the present third modification, a Y branch optical waveguide 71 is provided on the output side of the first optical waveguide 23 and connected to the second optical waveguide 24 through the intermediate optical waveguide 31 so that output light from the first optical waveguide 23 is outputted to the second optical waveguide 24 through the Y branch optical waveguide 71 and the intermediate optical waveguide 31. Further, radiation light radiated from a branch portion of the Y branch optical waveguide 71 in an off state is used as monitor light. Therefore, the first monitor PD 37 is provided at a position on an end face on the output side of the RZ optical modulator (chip) 70 such that it can detect the intensity of the radiation light from the branch portion of the Y branch optical waveguide 71.

Further, as seen in FIGS. 14(A) and 14(B), a Y branch optical waveguide 72 is provided on the output side of the second optical waveguide 24 and connected to the output side optical waveguide 32 so that output light from the second optical waveguide 24 is outputted through the Y branch optical waveguide 72 and the output side optical waveguide 32. Further, radiation light radiated from a branch portion of the Y branch optical waveguide 72 in an off state is used as monitor light. To this end, the second monitoring PD 38 is provided at a position on an end face on the output side of the RZ optical modulator (chip) 70 such that it can detect the intensity of the radiation light from the branch portion of the Y branch optical waveguide 72.

Particularly, the radiation light radiated from the branch portion of the Y branch optical waveguide 71 of the first optical waveguide 23 in an off state propagates in such a manner that it is spaced away from the chip surface obliquely toward a thicknesswise direction of the RZ optical modulator (chip) 70 as seen in FIG. 14(B). Consequently, the radiation light goes out from a position on the end face on the output side of the RZ optical modulator 70 near to the bottom face of the substrate 22. Therefore, the first monitor PD 37 is provided at a position on the end face on the output side of the RZ optical modulator 70 near to the bottom face of the substrate 22. It is to be noted that the disposed position of the first monitor PD 37 is determined in accordance with the distance from the position of the branch portion of the Y branch optical waveguide 71 of the first optical waveguide 23 to the end face on the output side of the RZ optical modulator 70.

Meanwhile, the radiation light radiated from the branch portion of the Y branch optical waveguide 72 of the second optical waveguide 24 in an off state goes out from another position on the end face on the output side of the RZ optical modulator 70 near to the surface of the substrate 22 since the distance from the branch portion of the Y branch optical waveguide 72 to the end face on the output side of the RZ optical modulator 70 is short. Therefore, the second monitoring PD 38 is provided at a position on the end face on the output side of the RZ optical modulator 70 near to the surface of the substrate 22. It is to be noted that the disposed position of the second monitoring PD 38 is determined in accordance with the distance from the position of the branch portion of the Y branch optical waveguide 72 of the second optical waveguide 24 to the end face on the output side of the RZ optical modulator 70.

In this manner, on the end face on the output side of the RZ optical modulator 70, the second monitoring PD 38 is provided at a position nearer to the surface of the substrate 22 while the first monitor PD 37 is provided at another position spaced away from the surface of the substrate 22 (that is, a position near to the bottom face of the substrate). In other words, the two monitoring PDs 37 and 38 are provided at positions displaced in the thicknesswise direction from each other on the output side end face of the substrate 22 so that they can detect the intensity of radiation light radiated from the branch portions of the Y branch optical waveguides 71 and 72.

It is to be noted that, in the present third modification, also the configuration of the input side of the first optical waveguide 23 differs. In particular, in the present third modification, a Y branch optical waveguide 73 is provided on the input side of the first optical waveguide 23 such that the input side optical waveguide 30 is connected to the first optical waveguide 23 through the Y branch optical waveguide 73. It is to be noted that, since the configuration of the remaining portion is similar to that of the second embodiment described above, description thereof is omitted here.

In this manner, the present third modification not only achieves the effects achieved by the configuration of the second embodiment described above but also can provide an increased tolerance to the disposed position of the second monitoring PD 38. Further, since there is no necessity to form a monitoring optical waveguide in order to produce monitor light, the overall size of the RZ optical modulator 70 can be made compact.

Description of the Fourth Modification to the Second Embodiment

Now, an RZ optical modulator as an optical waveguide device according to a fourth modification to the second embodiment of the present invention is described below with reference to FIG. 15.

The RZ optical modulator according to the present fourth modification is different from the RZ optical modulator of the second embodiment described above in the configuration of the output side of the first optical waveguide 23 and the configuration of the output side of the second optical waveguide 24.

Figure 15:
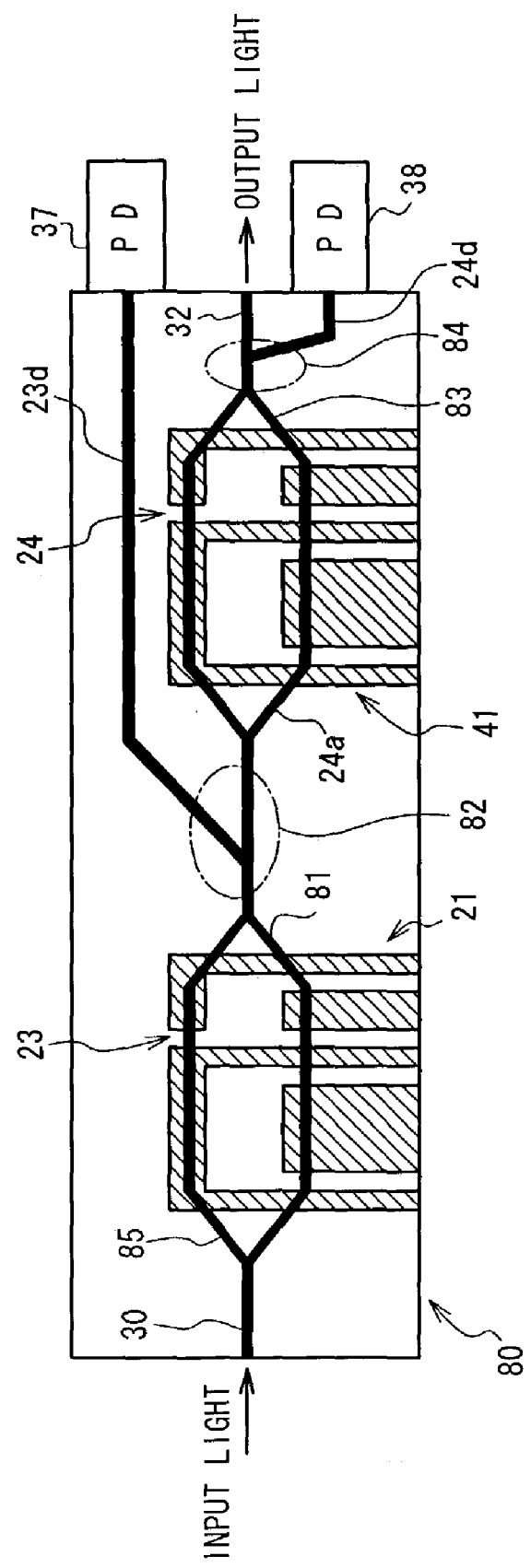
FIG. 15 is a schematic view showing a general configuration of an RZ optical modulator as an optical waveguide device according to a fourth modification to the second embodiment of the present invention.

In particular, as shown in FIG. 15, in the RZ optical modulator 80 according to the present fourth modification, a Y branch optical waveguide 81 is provided on the output side of the first optical waveguide 23, and a 1:N coupler (for example, a 1:10 coupler, a waveguide type coupler) 82 of the waveguide type for branching light at a predetermined branching ratio of 1:N is connected to the Y branch optical waveguide 81. Further, the first monitoring optical waveguide 23d formed so as to extend to an end face on the output side of the RZ optical modulator 80 is connected to one of ports (that is, a port for lower output power) of the 1:N coupler 82, and the first monitor PD (light detection section) 37 is provided at an end of the first monitoring optical waveguide 23d.

Meanwhile, as seen in FIG. 15, the Y branch optical waveguide 24a on the input side of the second optical waveguide 24 is connected to the other port (that is, a port for higher output power) of the 1:N coupler 82 so that output light from the first optical waveguide 23 is outputted toward the second optical waveguide 24 through the Y branch optical waveguide 81 and the 1:N coupler 82.

Further, as seen in FIG. 15, a Y branch optical waveguide 83 is provided on the output side of the second optical waveguide 24, and a 1:N coupler (for example, a 1:10 coupler, a waveguide type coupler) 84 of the waveguide type for branching light at a predetermined branching ratio of 1:N is connected to the Y branch optical waveguide 83. Further, the second monitoring optical waveguide 24d formed so as to extend to the end face on the output side of the RZ optical modulator 80 is connected to one of ports (that is, a port for lower output power) of the 1:N coupler 84, and a second monitoring PD (light detection section) 38 is disposed at an end of the second monitoring optical waveguide 24d.

Meanwhile, as seen in FIG. 15, the output side optical waveguide 32 is connected to the other port (that is, a port for higher output power) of the 1:N coupler 84 so that output light from the second optical waveguide 24 is outputted through the Y branch optical waveguide 83, 1:N coupler 84 and output side optical waveguide 32.

It is to be noted that, in the present fourth modification, also the configuration of the input side of the first optical waveguide 23 differs. In particular, in the present fourth modification, a Y branch optical waveguide 85 is provided on the input side of the first optical waveguide 23 such that the input side optical waveguide 30 is connected to the first optical waveguide 23 through the Y branch optical waveguide 85. It is to be noted that, since the configuration of the remaining portion is similar to that of the second embodiment described above, description thereof is omitted here.

In this manner, with the present fourth modification, since the output light is weakened at the ratio of 1:N, if the branching ratio of the 1:N coupler is designed appropriately, then there is no necessity to devise the configuration of the waveguide in order to attenuate the monitor light which propagates in the monitoring optical waveguides 23d and 24d after it is branched. Consequently, there is an advantage that the waveguide structure can be designed easily.

Description of the Fifth Modification to the Second Embodiment

Now, an RZ optical modulator as an optical waveguide device according to a fifth modification to the second embodiment of the present invention is described below with reference to FIG. 16.

The RZ optical modulator according to the present fifth modification is different from the RZ optical modulator of the second embodiment described above in the configuration of the output side of the first optical modulator 21 and the configuration of the output side of the second optical modulator 41. The RZ optical modulator according to the present fifth modification is further different in that a variable attenuator of the Mach-Zehnder type is provided as a Mach-Zehnder type modulation of the third stage next to the second optical modulator 41. An RZ optical modulator of the type just described is hereinafter referred to as variable attenuator integration type RZ optical modulator.

Figure 16:
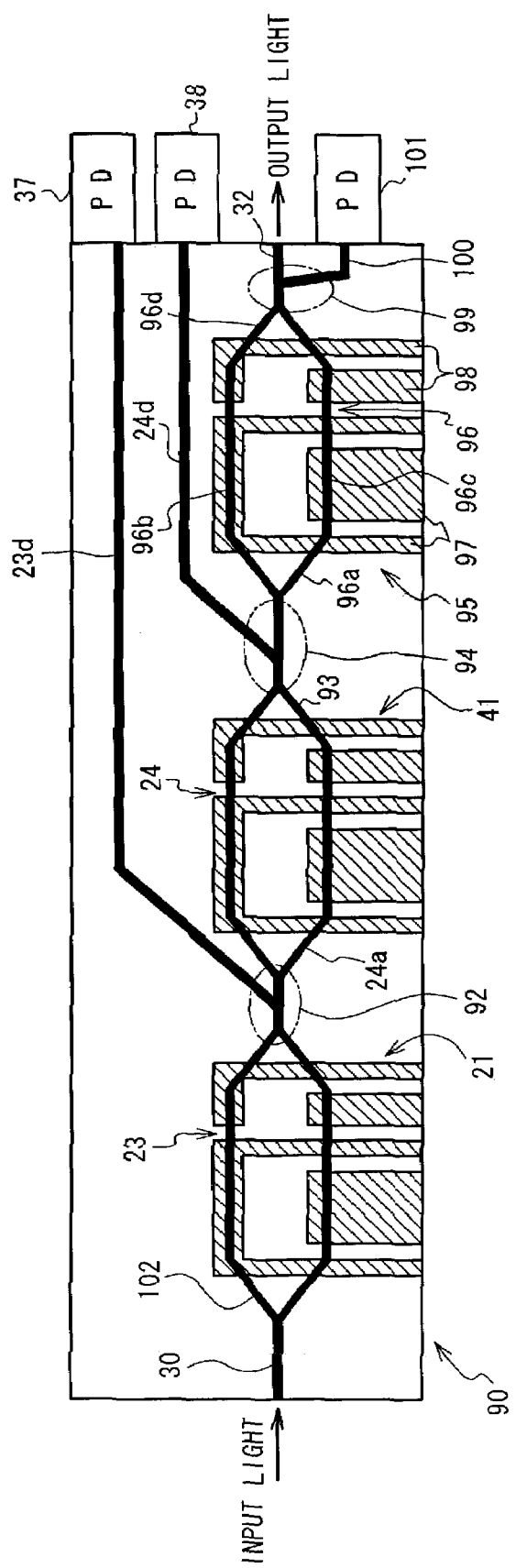
FIG. 16 is a schematic view showing a general configuration of an RZ optical modulator as an optical waveguide device according to a fifth modification to the second embodiment of the present invention.

In particular, as shown in FIG. 16, in the RZ optical modulator 90 according to the present fifth modification, a Y branch optical waveguide 91 is provided on the output side of the first optical waveguide 23, and a 1:N coupler (for example, a 1:10 coupler, a waveguide type coupler) 92 of the waveguide type for branching light at a predetermined branching ratio of 1:N is connected to the Y branch optical waveguide 91. Further, the first monitoring optical waveguide 23d formed so as to extend to an end face on the output side of the RZ optical modulator (chip) 90 is connected to one of ports (that is, a port for lower output power) of the 1:N coupler 92, and the first monitor PD (light detection section) 37 is provided at an end of the first monitoring optical waveguide 23d.

Meanwhile, as seen in FIG. 16, the Y branch optical waveguide 24a on the input side of the second optical waveguide 24 is connected to the other port (that is, a port for higher output power) of the 1:N coupler 92 so that output light from the first optical waveguide 23 is outputted toward the second optical waveguide 24 through the Y branch optical waveguide 91 and the 1:N coupler 92.

Further, as seen in FIG. 16, a Y branch optical waveguide 93 is provided on the output side of the second optical waveguide 24, and a 1:N coupler (for example, a 1:10 coupler, a waveguide type coupler) 94 of the waveguide type for branching light at a predetermined branching ratio of 1:N is connected to the Y branch optical waveguide 93. Further, the second monitoring optical waveguide 24d formed so as to extend to the end face on the output side of the RZ optical modulator 90 is connected to one of ports (that is, a port for lower output power) of the 1:N coupler 94, and the second monitoring PD (light detection section) 38 is disposed at an end of the second monitoring optical waveguide 24d.

Meanwhile, as seen in FIG. 16, a variable attenuator 95 of the Mach-Zehnder type is connected to the other port (that is, a port for higher output power) of the 1:N coupler 94. In other words, the variable attenuator 95 of the Mach-Zehnder type is connected at the following stage of the second optical modulator 41. Consequently, output light from the second optical waveguide 24 is inputted to the variable attenuator 95 through the Y branch optical waveguide 93 and the 1:N coupler 94.

As shown in FIG. 16, the variable attenuator 95 includes a Mach-Zehnder type optical waveguide 96 which in turn includes an input side Y branch optical waveguide 96a, two parallel linear optical waveguides 96b and 96c, and an output side optical waveguide 96d, an electrode 97, and a bias electrode 98. A predetermined dc voltage (DC voltage)

is applied to the linear optical waveguides 96b and 96c through the electrode 97 to vary the refractivity of the linear optical waveguides 96b and 96c to vary the transmission factor of the linear optical waveguides 96b and 96c thereby to attenuate the output power (power) of light (signal light) which propagates in the linear optical waveguides 96b and 96c. To this end, a voltage supply section (including a power supply circuit and a drive circuit) is connected to the electrode 97.

Further, a 1:N coupler (for example, a 1:10 coupler, a waveguide type coupler) 99 of the waveguide type for branching light at a predetermined ratio of 1:N is connected to the optical waveguide 96d on the output side of the variable attenuator 95. A third monitoring optical waveguide 100 formed so as to extend to an end face on the output side of the RZ optical modulator (chip) 90 is connected to one of ports (that is, a port for lower output power) of the 1:N coupler 99, and a third monitoring PD (light detection section) 101 is disposed at an end of the third monitoring optical waveguide 100.

Thus, feedback control of the bias voltage (DC bias voltage) is performed based on the intensity of monitor light detected by the third monitoring PD 101. In particular, the feedback control of the bias voltage is performed so that the detection value detected by the third monitoring PD 101 may approach a target value. To this end, a third bias control section (bias control circuit) is connected to the third monitoring PD 101.

Where a predetermined DC voltage is applied to the electrode 97 and the bias voltage is applied so as to approach a target value which can be set arbitrarily in this manner, the DC voltage to be applied to the linear optical waveguides 96b and 96c can be variably controlled to adjust the power of the output light.

Meanwhile, as seen in FIG. 16, the output side optical waveguide 32 is connected to the other port (that is, a port for higher output power) of the 1:N coupler 99 so that output light from the variable attenuator 95 is outputted through the 1:N coupler 99 and the output side optical waveguide 32.

It is to be noted that, in the present fifth modification, also the configuration of the input side of the first optical waveguide 23 differs. In particular, in the present fifth modification, a Y branch optical waveguide 102 is provided on the input side of the first optical waveguide 23 such that the input side optical waveguide 30 is connected to the first optical waveguide 23 through the Y branch optical waveguide 102. It is to be noted that, since the configuration of the remaining portion is similar to that of the second embodiment described hereinabove, description thereof is omitted here.

In this manner, with the present fifth modification, since the output light is weakened at the ratio of 1:N similarly as in the fourth modification described above, if the branching ratio of the 1:N coupler is designed appropriately, then there is no necessity to devise the configuration of the waveguide in order to attenuate the monitor light which propagates in the monitoring optical waveguides 23d and 24d after it is branched. Consequently, there is an advantage that the waveguide structure can be designed easily.

Figure 17:
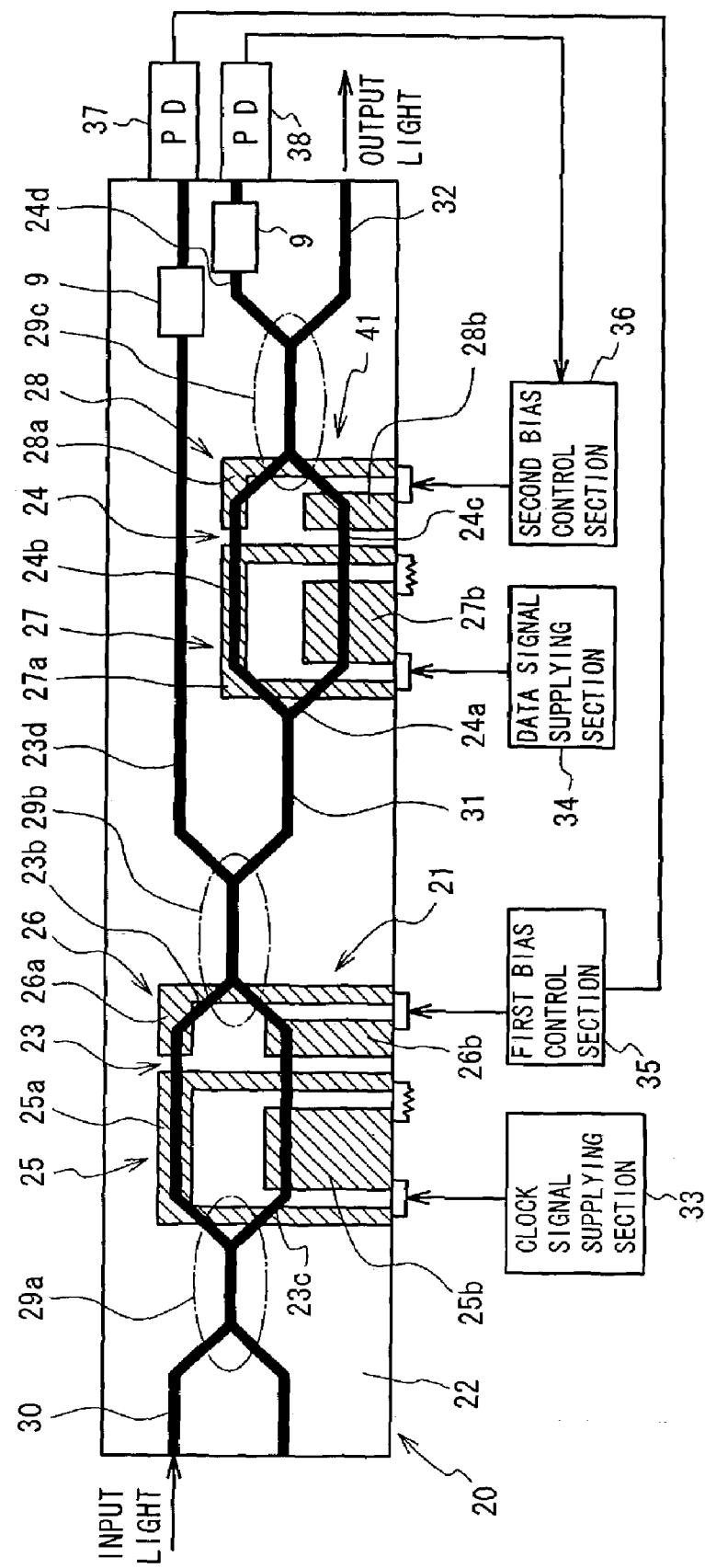
FIG. 17 is a schematic view showing a general configuration of an RZ optical modulator as an optical waveguide device according to a different modification to the second embodiment of the present invention.
Figure 18:
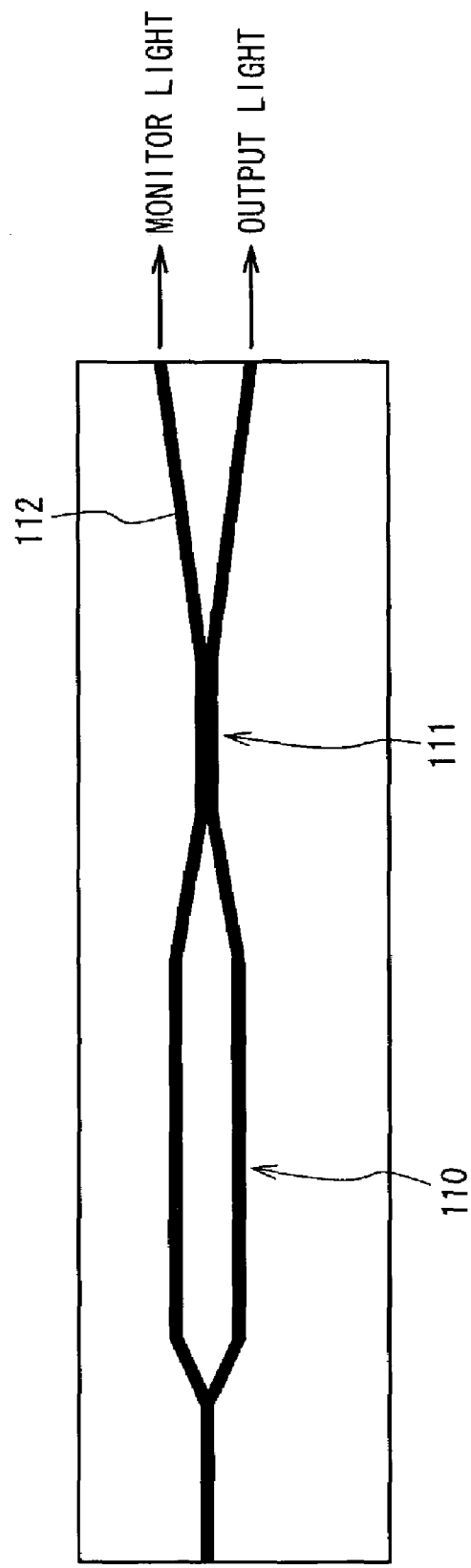
FIG. 18 is a schematic view illustrating a method wherein monitor light used for the bias control is extracted using a monitoring optical waveguide.
Figure 19:
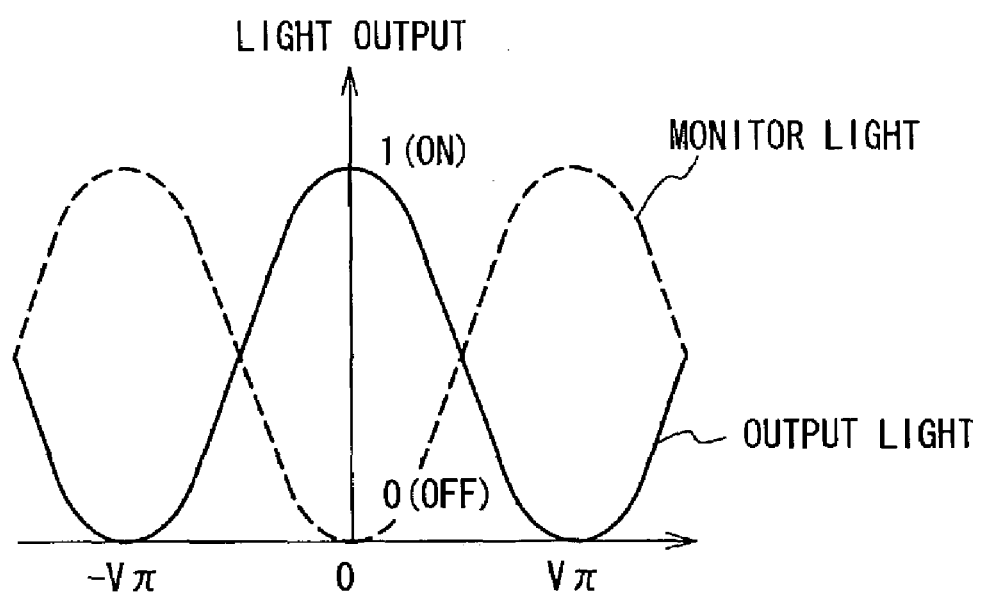
FIG. 19 is a diagrammatic view illustrating a subject when the monitor light is extracted using the monitoring optical waveguide and illustrating light outputs of signal light and monitor light.

It is to be noted that also it is preferable to provide, as shown in FIG. 17, an attenuation section 9 for attenuating monitor light propagating in the monitoring optical waveguide in the first embodiment described hereinabove for each of the monitoring optical waveguides 23d and 24d of the RZ optical modulator 20 as the optical waveguide device according to the second embodiment described hereinabove. This configuration provides not only the advantages of the second embodiment and the modifications to the second embodiment described hereinabove but also additional advantages that monitor light can be detected accurately and reliably, that the degree of freedom in selection of the monitoring PD 10 which can be adopted increases and that monitor light of an intensity suitable for use for bias control can be obtained. It is to be noted that, if it is necessary to attenuate monitor light propagating in the monitoring optical waveguide in the modifications to the second embodiment described above, then the attenuation section 9 should be provided similarly.

It is to be noted that, while, in the embodiments and the modifications described above, a monitoring PD used for detection of monitor light extracted through a monitoring optical waveguide is mounted on an end face of a substrate, the location of the monitoring PD is not limited to this, and the monitoring PD may be mounted at a position (for example, on a housing) spaced by a predetermined distance from the end face of the substrate in accordance with the intensity of the monitor light guided along the monitoring optical waveguide.

The present invention is not limited to the embodiments and modifications specifically described above, and variations and modifications can be made without departing from the scope of the present invention.

What is claimed is:

1. An optical modulator comprising:
  a substrate having an electro-optical effect;
  a plurality of Mach-Zehnder type optical waveguides formed in series on said substrate;
  a plurality of electrodes provided independently of each other and individually for said plurality of Mach-Zehnder type optical waveguides, wherein said plurality of electrodes includes a respective electrode supplying a clock signal to one of said plurality of Mach-Zehnder type optical waveguides, and a different respective electrode supplying a data signal to a different one of said plurality of Mach-Zehnder type optical waveguides; and
  a plurality of light detectors corresponding, respectively, to said plurality of Mach-Zehnder type optical waveguides, for detecting the intensity of light emitted from said plurality of Mach-Zehnder type optical waveguides, respectively,
  wherein each light detector detects the intensity of the light emitted from the corresponding Mach-Zehnder type optical waveguide without the detected light having been passed through a Mach-Zehnder type optical waveguide positioned downstream of said corresponding Mach-Zehnder type optical waveguide in the series.

2. The optical modulator as claimed in claim 1, further comprising:
  a plurality of waveguide type couplers provided individually on the output side of said plurality of Mach-Zehnder type optical waveguides; and
  a plurality of monitoring optical waveguides each connected to one of ports of a corresponding one of said plurality of waveguide type couplers;
  said plurality of light detectors detecting the intensity of the monitor light guided by corresponding ones of said monitoring optical waveguides.

3. The optical modulator as claimed in claim 2, wherein each of said waveguide type couplers is a 3dB coupler, and each of said monitoring optical waveguides is connected to one of ports of a corresponding one of the 3dB couplers.

4. The optical modulator as claimed in claim 2, wherein each of said waveguide type couplers is a 1:N coupler which branches light at a branching ratio of 1:N, and each of said monitoring optical waveguides is connected to one of ports of a corresponding one of the 1:N couplers.

5. The optical modulator as claimed in claim 4, wherein said 1:N coupler is a 1:10 coupler.

6. The optical modulator as claimed in claim 1, further comprising:
a waveguide type coupler provided on the output side of a respective Mach-Zehnder type optical waveguide of said plurality of Mach-Zehnder type optical waveguides;
a Y-branch optical waveguide provided on an output side of a Mach-Zehnder type optical waveguide other than said respective Mach-Zehnder type optical waveguide of said plurality of Mach-Zehnder type optical waveguides; and
a monitoring optical waveguide connected to a port of said waveguide type coupler;
one of said plurality of light detectors detecting the intensity of monitor light guided by the monitoring optical waveguide while at least one other of the light detectors detect the intensity of radiated light radiated from a branch portion of the Y-branch optical waveguide.

7. The optical modulator as claimed in claim 1, wherein all of said plurality of Mach-Zehnder type optical waveguides have a Y-branch optical waveguide on the output side thereof, and said plurality of light detectors are arranged at positions displaced from each other in a thicknesswise direction on an output side end face of said substrate so that the intensity of the radiated light radiated from the branch portion of the corresponding Y-branch optical waveguide may be detected.

8. The optical modulator as claimed in claim 2, wherein one of said plurality of monitoring optical waveguides is formed so as to extend to a side face of said substrate, and one of said plurality of light detectors is provided on the side face of said substrate so that the light outputted from the one monitoring optical waveguide may be detected.

9. The optical modulator as claimed in claim 1, wherein said substrate is formed from lithium niobate.

10. An optical modulator, comprising:
a substrate having an electro-optical effect;
first and second Mach-Zehnder type optical waveguides formed in series on said substrate;
a first signal electrode provided for said first Mach-Zehnder type optical waveguide for being supplied with a clock signal, wherein the first signal electrode is a traveling wave electrode;
a second signal electrode provided for said second Mach-Zehnder type optical waveguide for being supplied with a data signal, wherein the second signal electrode is a traveling wave electrode;
a first bias electrode provided for said first Mach-Zehnder type optical waveguide for applying a bias voltage;
a second bias electrode provided for said second Mach-Zehnder type optical waveguide for applying the bias voltage;
a first monitoring photo-detector for detecting the intensity of light outputted from said first Mach-Zehnder type optical waveguide without the light having been passed through a Mach-Zehnder type optical waveguide downstream of said first Mach-Zehnder type optical waveguide; and
a second monitoring photo-detector for detecting the intensity of light outputted from said second Mach-Zehnder type optical waveguide without the light having been passed through a Mach-Zehnder type optical waveguide downstream of said second Mach-Zehnder type optical waveguide.

11. The optical modulator as claimed in claim 10, further comprising:
a 3dB coupler provided on the output side of said first or second Mach-Zehnder type optical waveguide;
a monitoring optical waveguide for guiding light branched by said 3dB coupler from within the light outputted from said first or second Mach-Zehnder optical waveguide as monitor light to said first or second monitoring photo-detector; and
an attenuation section for attenuating the monitor light propagating in said monitoring optical waveguide.

12. An optical waveguide device, comprising:
a substrate having an electro-optical effect;
a Mach-Zehnder type optical waveguide formed on said substrate;
an electrode provided for said Mach-Zehnder type optical waveguide;
a coupler branching a portion of light outputted from said Mach-Zehnder type optical waveguide as monitor light;
a monitoring optical waveguide guiding the monitor light; and
a light detector detecting intensity of the monitor light guided by said monitoring optical waveguide,
wherein said coupler branches $1/(1+N)$ of the light outputted from said Mach-Zehnder type optical waveguide as the monitor light so that the intensity of the monitor light detected by said light detector is equal to or smaller than a maximum permissible light intensity of said light detector even when the light outputted from said Mach-Zehnder type optical waveguide is at an intensity greater than the maximum permissible light intensity of said light detector, where $N>1$.

13. An optical waveguide device as claimed in claim 12, wherein the optical waveguide device is an optical modulator.

14. An optical waveguide device comprising:
a substrate having an electro-optical effect;
a Mach-Zehnder type optical waveguide formed on said substrate;
an electrode provided for said Mach-Zehnder type optical waveguide;
a coupler branching a portion of light outputted from said Mach-Zehnder type optical waveguide as monitor light;
branch optical waveguides branching the monitor light into branched lights, respectively, and guiding the branched lights, respectively; and
a light detector detecting intensity of at least one of the guided branched lights,
wherein the branching by said branch optical waveguides thereby attenuates the monitor light such that the intensity of said at least one of the guided branched lights detected by said light detector is equal to or smaller than a maximum permissible light intensity of said light detector even when the light outputted from said Mach-Zehnder type optical waveguide is at an intensity greater than the maximum permissible light intensity of said light detector.

15. An optical waveguide device as claimed in claim 14, wherein the optical waveguide device is an optical modulator.

16. An optical waveguide device comprising:
a substrate having an electro-optical effect;
a Mach-Zehnder type optical waveguide formed on said substrate;
an electrode provided for said Mach-Zehnder type optical waveguide;
a 1:N coupler branching a portion of light outputted from said Mach-Zehnder type optical waveguide at a branching ratio of 1:N as monitor light;
a monitoring optical waveguide guiding the monitor light; and
a light detector detecting intensity of the monitor light guided by said monitoring optical waveguide,
wherein the branching ratio of said coupler and attenuation of the monitor light by said monitoring optical waveguide thereby cause the detected intensity of the monitor light to be equal to or smaller than a maximum permissible light intensity of said light detector even when the light outputted from said Mach-Zehnder type optical waveguide is at an intensity greater than the maximum permissible light intensity of said light detector.

17. An optical waveguide device as claimed in claim 16, wherein the optical waveguide device is an optical modulator.

18. An optical waveguide device comprising:
a substrate having an electro-optical effect;
a Mach-Zehnder type optical waveguide formed on said substrate;
an electrode provided for said Mach-Zehnder type optical waveguide;
a monitoring optical waveguide guiding part of light outputted from said Mach-Zehnder type optical waveguide as monitor light, the guided monitor light being emitted from an end of said monitoring optical waveguide;
a beam expansion section provided in a proximity of the end of said monitoring optical waveguide and branching the monitor light emitted from the end of said monitoring optical waveguide into at least two branched lights which together form attenuated monitor light; and
a light detector detecting intensity of the attenuated monitor light,
wherein the branching by said beam expansion section thereby attenuates the monitor light emitted from the end of said monitoring optical waveguide such that the intensity of the attenuated monitor light detected by said light detector is equal to or smaller than a maximum permissible light intensity of said light detector even when the light outputted from said Mach-Zehnder type optical waveguide is at an intensity greater than the maximum permissible light intensity of said light detector.

19. The optical waveguide device as claimed in claim 18, wherein said beam expansion section is formed by cutting said monitoring optical waveguide at a position spaced by a predetermined distance from an end face or a side face of said substrate.

20. An optical waveguide device as claimed in claim 18, wherein the optical waveguide device is an optical modulator.

21. An optical waveguide device comprising:
a substrate having an electro-optical effect;
a Mach-Zehnder type optical waveguide formed on said substrate;
an electrode provided for said Mach-Zehnder type optical waveguide;
a monitoring optical waveguide guiding part of light outputted from said Mach-Zehnder type optical waveguide as monitor light, wherein an end of said monitoring optical waveguide is branched into at least two branches so that the guided monitor light emitted from the end of said monitoring optical waveguide is branched into at least two branches which together form attenuated monitor light, respectively; and
a light detector detecting intensity of the attenuated monitor light,
wherein said monitoring optical waveguide thereby attenuates the monitor light to form the attenuated monitor light such that the intensity of the attenuated monitor light detected by said light detector is equal to or smaller than a maximum permissible light intensity of said light detector even when the light outputted from said Mach-Zehnder type optical waveguide is at an intensity greater than the maximum permissible light intensity of said light detector.

22. An optical modulator comprising:
a substrate having an electro-optical effect;
a plurality of Mach-Zehnder type optical waveguides formed in series on said substrate;
a plurality of electrodes provided independently of each other and individually for said plurality of Mach-Zehnder type optical waveguides, wherein said plurality of electrodes includes a respective electrode supplying a clock signal to one of said plurality of Mach-Zehnder type optical waveguides, and a different respective electrode supplying a data signal to a different one of said plurality of Mach-Zehnder type optical waveguides;
a plurality of light detectors corresponding, respectively, to said plurality of Mach-Zehnder type optical waveguides, for detecting the intensity of light emitted from said plurality of Mach-Zehnder type optical waveguides, respectively; and
a bias control section for controlling, based on the intensity of the light detected by one of said plurality of light detectors, a bias voltage to be applied to one of said electrodes provided for that one of said Mach-Zehnder type optical waveguides which corresponds to said one of said plurality of light detectors,
wherein each light detector detects the intensity of the light emitted from the corresponding Mach-Zehnder type optical waveguide without the detected light having been passed through a Mach-Zehnder type optical waveguide positioned downstream of said corresponding Mach-Zehnder type optical waveguide in the series.

23. An optical waveguide device comprising:
a first Mach-Zehnder type optical waveguide processing input light and a second Mach-Zehnder type optical waveguide processing light, which is processed by said first Mach-Zehnder type optical waveguide, disposed on a substrate;
a first monitor monitoring part of light outputted from said first Mach-Zehnder type optical waveguide, the intensity of which is equal to or smaller than a maximum permissible light intensity of said first monitor; and
a controller controlling said first Mach-Zehnder type optical waveguide based on light monitored by said first monitor.

24. The optical waveguide device as claimed in claim 23, further comprising:

a second monitor monitoring light outputted from said second Mach-Zehnder type optical waveguide, wherein said controller controls said second Mach-Zehnder type optical waveguide based on light monitored by said second monitor.

25. An optical waveguide device as claimed in claim 23, wherein the optical waveguide device is an optical modulator.

26. An optical modulator comprising:

a first Mach-Zehnder type optical modulator and a second Mach-Zehnder type optical modulator modulating light which is modulated by the first Mach-Zehnder type optical modulator disposed on a substrate;

a first monitor monitoring part of light outputted from said first Mach-Zehnder type optical modulator, the intensity of which is equal to or smaller than a maximum permissible light intensity of said first monitor; and a controller controlling said first Mach-Zehnder type optical modulator based on light monitored by said first monitor.

27. The optical modulator as claimed in claim 26, further comprising:

a second monitor monitoring light outputted from said second Mach-Zehnder type optical modulator, wherein said controller controls said second Mach-Zehnder type optical modulator based on light monitored by said second monitor.

28. An optical modulator comprising:

a substrate;

first and second Mach-Zehnder type optical waveguides disposed in series on the substrate with the second Mach-Zehnder type optical waveguide being downstream of the first Mach-Zehnder type optical waveguide;

first and second electrodes provided independently of each other and individually for said first and second Mach-Zehnder type optical waveguides, respectively, wherein said first electrode supplies a clock signal to said first Mach-Zehnder type optical waveguide, and said second electrode supplies a data signal to said second Mach-Zehnder type optical waveguide; and first and second light detectors corresponding, respectively, to said first and second Mach-Zehnder type optical waveguides, detecting intensity of light emitted from said first and second Mach-Zehnder type optical waveguides, respectively, wherein said first light detector detects the intensity of the light emitted from the first Mach-Zehnder type optical waveguide without the detected light having been passed through the second Mach-Zehnder type optical waveguide, and the second light detector detects the intensity of the light emitted from the second Mach-Zehnder type optical waveguide without the detected light having been passed through a Mach-Zehnder type optical waveguide positioned downstream of said second Mach-Zehnder type optical waveguide.

* * * * *